United States Patent
Chang et al.

(10) Patent No.: US 9,330,722 B2
(45) Date of Patent: May 3, 2016

(54) METHODS AND ARCHITECTURE FOR INDEXING AND EDITING COMPRESSED VIDEO OVER THE WORLD WIDE WEB

(75) Inventors: Shih-Fu Chang, New York, NY (US); Horace J. Meng, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 1304 days.

(21) Appl. No.: 13/078,626

(22) Filed: Apr. 1, 2011

(65) Prior Publication Data

US 2011/0255605 A1    Oct. 20, 2011

Related U.S. Application Data

(60) Continuation of application No. 12/874,337, filed on Sep. 2, 2010, now abandoned, which is a division of application No. 10/728,345, filed on Dec. 4, 2003, now Pat. No. 7,817,722, which is a division of application No. 09/423,769, filed as application No. PCT/US97/08266 on May 16, 1997, now Pat. No. 6,735,253.

(51) Int. Cl.
| | |
|---|---|
| *H04N 7/18* | (2006.01) |
| *G11B 27/28* | (2006.01) |
| *G11B 27/034* | (2006.01) |

(52) U.S. Cl.
CPC .............. *G11B 27/28* (2013.01); *G11B 27/034* (2013.01)

(58) Field of Classification Search
CPC . H04N 7/50; H04N 7/26941; H04N 21/2365; H04N 21/4347
USPC ................................. 348/143–160, 699–702; 375/240.11–240.29
See application file for complete search history.

(56) References Cited

U.S. PATENT DOCUMENTS

| | | |
|---|---|---|
| 4,649,380 A | 3/1987 | Pena |
| 4,649,482 A | 3/1987 | Raviv et al. |
| 4,712,248 A | 12/1987 | Hongo |
| 5,144,685 A | 9/1992 | Nasar et al. |
| 5,191,645 A | 3/1993 | Carlucci et al. |

(Continued)

FOREIGN PATENT DOCUMENTS

| | | |
|---|---|---|
| EP | 0579319 | 1/1994 |
| EP | 0587329 | 3/1994 |

(Continued)

OTHER PUBLICATIONS

Gholamhosein et al., "Semantic Clustering and Querying on Heterogeneous Features for Visual Data", *Proceedings of the ACM Multimedia 98, MM '98*, Bristol, Sep. 12-16, 1998, ACM International Multimedia Conference, New York, NY: ACM, US, vol. Conf. 6, Sep. 12, 1998, pp. 3-12, XP000977482.

(Continued)

*Primary Examiner* — Andy Rao
(74) *Attorney, Agent, or Firm* — Baker Botts L.L.P.

(57) ABSTRACT

A system and method is provided for editing and parsing compressed digital information. The compressed digital information may include visual information which is edited and parsed in the compressed domain. In a preferred embodiment, the present invention provides a method for detecting moving objects in a compressed digital bitstream which represents a sequence of fields or frames of video information for one or more captured scenes of video.

5 Claims, 11 Drawing Sheets

(56) References Cited

U.S. PATENT DOCUMENTS

| | | | |
|---|---|---|---|
| 5,204,706 | A | 4/1993 | Saito |
| 5,208,857 | A | 5/1993 | Lebrat |
| 5,262,856 | A | 11/1993 | Lippman et al. |
| 5,408,274 | A | 4/1995 | Chang et al. |
| 5,428,774 | A | 6/1995 | Takahashi et al. |
| 5,461,679 | A | 10/1995 | Normile et al. |
| 5,465,353 | A | 11/1995 | Hull et al. |
| 5,488,664 | A | 1/1996 | Shamir |
| 5,493,677 | A | 2/1996 | Balogh et al. |
| 5,530,759 | A | 6/1996 | Braudaway et al. |
| 5,546,571 | A | 8/1996 | Shan et al. |
| 5,546,572 | A | 8/1996 | Seto et al. |
| 5,555,354 | A | 9/1996 | Strasnick et al. |
| 5,555,378 | A | 9/1996 | Gelman et al. |
| 5,557,728 | A | 9/1996 | Garrett et al. |
| 5,566,089 | A | 10/1996 | Hoogenboom |
| 5,572,260 | A | 11/1996 | Onishi et al. |
| 5,579,444 | A | 11/1996 | Dalziel et al. |
| 5,579,471 | A | 11/1996 | Barber et al. |
| 5,585,852 | A | 12/1996 | Agarwal |
| 5,606,655 | A | 2/1997 | Arman et al. |
| 5,613,032 | A | 3/1997 | Cruz et al. |
| 5,615,112 | A | 3/1997 | Liu Sheng et al. |
| 5,617,119 | A | 4/1997 | Briggs et al. |
| 5,623,690 | A | 4/1997 | Palmer et al. |
| 5,630,121 | A | 5/1997 | Braden-Harder et al. |
| 5,642,477 | A | 6/1997 | de Carmo et al. |
| 5,655,117 | A | 8/1997 | Goldberg et al. |
| 5,664,018 | A | 9/1997 | Leighton |
| 5,664,177 | A | 9/1997 | Lowry |
| 5,668,897 | A | 9/1997 | Stolfo |
| 5,684,715 | A | 11/1997 | Palmer |
| 5,694,334 | A | 12/1997 | Donahue et al. |
| 5,694,945 | A | 12/1997 | Ben-Haim |
| 5,696,964 | A | 12/1997 | Cox et al. |
| 5,701,510 | A | 12/1997 | Johnson et al. |
| 5,708,805 | A | 1/1998 | Okamoto et al. |
| 5,713,021 | A | 1/1998 | Kondo et al. |
| 5,721,815 | A | 2/1998 | Ottesen et al. |
| 5,724,484 | A | 3/1998 | Kagami et al. |
| 5,734,752 | A | 3/1998 | Knox |
| 5,734,893 | A | 3/1998 | Li et al. |
| 5,742,283 | A | 4/1998 | Kim |
| 5,751,286 | A | 5/1998 | Barber et al. |
| 5,758,076 | A | 5/1998 | Wu et al. |
| 5,767,922 | A | 6/1998 | Zabih et al. |
| 5,768,578 | A | 6/1998 | Kirk et al. |
| 5,790,703 | A | 8/1998 | Wang |
| 5,794,178 | A | 8/1998 | Caid et al. |
| 5,794,242 | A | 8/1998 | Green et al. |
| 5,802,361 | A | 9/1998 | Wang et al. |
| 5,805,733 | A | 9/1998 | Wang et al. |
| 5,805,804 | A | 9/1998 | Laursen et al. |
| 5,809,139 | A | 9/1998 | Girod et al. |
| 5,809,160 | A | 9/1998 | Powell et al. |
| 5,821,945 | A | 10/1998 | Yeo et al. |
| 5,822,524 | A | 10/1998 | Chen et al. |
| 5,825,892 | A | 10/1998 | Braudaway et al. |
| 5,835,163 | A * | 11/1998 | Liou et al. ................ 348/700 |
| 5,848,155 | A | 12/1998 | Cox |
| 5,852,435 | A | 12/1998 | Vigneaux et al. |
| 5,852,823 | A | 12/1998 | De Bonet |
| 5,870,754 | A | 2/1999 | Dimitrova et al. |
| 5,873,080 | A | 2/1999 | Coden et al. |
| 5,884,298 | A | 3/1999 | Smith et al. |
| 5,887,061 | A | 3/1999 | Sato |
| 5,893,095 | A | 4/1999 | Jain et al. |
| 5,915,027 | A | 6/1999 | Cox et al. |
| 5,930,783 | A | 7/1999 | Li et al. |
| 5,937,422 | A | 8/1999 | Nelson et al. |
| 5,943,422 | A | 8/1999 | Van Wie et al. |
| 5,949,885 | A | 9/1999 | Leighton |
| 5,960,081 | A | 9/1999 | Vynne et al. |
| 5,963,203 | A | 10/1999 | Goldberg et al. |
| 5,969,755 | A | 10/1999 | Courtney |
| 5,983,218 | A | 11/1999 | Syeda-Mahwood |
| 5,987,459 | A | 11/1999 | Swanson et al. |
| 5,995,095 | A | 11/1999 | Ratakonda |
| 5,995,978 | A | 11/1999 | Cullen et al. |
| 6,031,914 | A | 2/2000 | Tewfik et al. |
| 6,037,984 | A | 3/2000 | Isnardi et al. |
| 6,041,079 | A | 3/2000 | Yim |
| 6,047,374 | A | 4/2000 | Barton |
| 6,058,186 | A | 5/2000 | Enari |
| 6,058,205 | A | 5/2000 | Bahl et al. |
| 6,064,764 | A | 5/2000 | Bhaskaran et al. |
| 6,070,167 | A | 5/2000 | Qian et al. |
| 6,070,228 | A | 5/2000 | Belknap et al. |
| 6,072,542 | A | 6/2000 | Wilcox et al. |
| 6,075,875 | A | 6/2000 | Gu |
| 6,078,664 | A | 6/2000 | Moskowitz et al. |
| 6,079,566 | A | 6/2000 | Eleftheriadis et al. |
| 6,081,278 | A | 6/2000 | Chen |
| 6,092,072 | A | 7/2000 | Guha et al. |
| 6,100,930 | A | 8/2000 | Kolczynski |
| 6,104,411 | A | 8/2000 | Ito et al. |
| 6,108,434 | A | 8/2000 | Cox et al. |
| 6,115,717 | A | 9/2000 | Mehrotra et al. |
| 6,122,403 | A | 9/2000 | Rhoads |
| 6,125,229 | A | 9/2000 | Dimitrova et al. |
| 6,141,447 | A | 10/2000 | Linzer et al. |
| 6,154,755 | A | 11/2000 | Dellert et al. |
| 6,157,745 | A | 12/2000 | Salembier |
| 6,157,746 | A | 12/2000 | Sodagar et al. |
| 6,167,084 | A | 12/2000 | Wang et al. |
| 6,172,675 | B1 | 1/2001 | Ahmad et al. |
| 6,178,416 | B1 | 1/2001 | Thompson et al. |
| 6,185,329 | B1 | 2/2001 | Zhang et al. |
| 6,195,458 | B1 | 2/2001 | Warnick et al. |
| 6,208,735 | B1 | 3/2001 | Cox et al. |
| 6,208,745 | B1 | 3/2001 | Florencio et al. |
| 6,222,932 | B1 | 4/2001 | Rao et al. |
| 6,223,183 | B1 | 4/2001 | Smith et al. |
| 6,236,395 | B1 | 5/2001 | Sezan et al. |
| 6,240,424 | B1 | 5/2001 | Hirata |
| 6,243,419 | B1 | 6/2001 | Satou et al. |
| 6,246,804 | B1 | 6/2001 | Sato et al. |
| 6,252,975 | B1 | 6/2001 | Bozdagi et al. |
| 6,269,358 | B1 | 7/2001 | Hirata |
| 6,275,599 | B1 | 8/2001 | Adler et al. |
| 6,282,299 | B1 | 8/2001 | Tewfik et al. |
| 6,282,300 | B1 | 8/2001 | Bloom et al. |
| 6,285,995 | B1 | 9/2001 | Abdel-Mottaleb et al. |
| 6,297,797 | B1 | 10/2001 | Takeuchi et al. |
| 6,327,390 | B1 | 12/2001 | Sun et al. |
| 6,332,030 | B1 | 12/2001 | Manjunath et al. |
| 6,339,450 | B1 | 1/2002 | Chang et al. |
| 6,356,309 | B1 | 3/2002 | Masaki et al. |
| 6,360,234 | B2 | 3/2002 | Jain et al. |
| 6,366,314 | B1 | 4/2002 | Goudezeune et al. |
| 6,366,701 | B1 | 4/2002 | Chalom et al. |
| 6,385,329 | B1 | 5/2002 | Sharma et al. |
| 6,385,602 | B1 | 5/2002 | Tso et al. |
| 6,393,394 | B1 | 5/2002 | Ananthapadmanabhan et al. |
| 6,404,925 | B1 | 6/2002 | Foote et al. |
| 6,418,232 | B1 | 7/2002 | Nakano et al. |
| 6,418,421 | B1 | 7/2002 | Hurtado et al. |
| 6,442,538 | B1 | 8/2002 | Nojima |
| 6,453,053 | B1 | 9/2002 | Wakasu |
| 6,466,940 | B1 | 10/2002 | Mills |
| 6,473,459 | B1 | 10/2002 | Sugano et al. |
| 6,476,814 | B1 | 11/2002 | Garvey |
| 6,480,538 | B1 | 11/2002 | Trovato |
| 6,487,301 | B1 | 11/2002 | Zhao |
| 6,499,105 | B1 | 12/2002 | Yoshiura et al. |
| 6,526,099 | B1 | 2/2003 | Christopoulos et al. |
| 6,532,541 | B1 | 3/2003 | Chang et al. |
| 6,546,135 | B1 | 4/2003 | Lin et al. |
| 6,549,911 | B2 | 4/2003 | Gustman |
| 6,556,695 | B1 | 4/2003 | Packer et al. |
| 6,556,958 | B1 | 4/2003 | Chickering |
| 6,560,284 | B1 | 5/2003 | Girod et al. |
| 6,567,805 | B1 | 5/2003 | Johnson et al. |
| 6,581,058 | B1 | 6/2003 | Fayyad et al. |

(56) References Cited

U.S. PATENT DOCUMENTS

| | | |
|---|---|---|
| 6,606,329 B1 | 8/2003 | Herrmann |
| 6,606,393 B1 | 8/2003 | Xie et al. |
| 6,628,824 B1 | 9/2003 | Belanger |
| 6,643,387 B1 | 11/2003 | Sethuraman et al. |
| 6,654,931 B1 | 11/2003 | Haskell et al. |
| 6,678,389 B1 | 1/2004 | Sun et al. |
| 6,683,966 B1 | 1/2004 | Tian et al. |
| 6,700,935 B2 | 3/2004 | Lee |
| 6,701,309 B1 | 3/2004 | Beeferman et al. |
| 6,708,055 B2 | 3/2004 | Geiser et al. |
| 6,714,909 B1 | 3/2004 | Gibbon et al. |
| 6,716,175 B2 | 4/2004 | Geiser et al. |
| 6,718,047 B2 | 4/2004 | Rhoads |
| 6,721,733 B2 | 4/2004 | Lipson et al. |
| 6,725,372 B1 | 4/2004 | Lewis et al. |
| 6,735,253 B1 | 5/2004 | Chang et al. |
| 6,741,655 B1 | 5/2004 | Chang et al. |
| 6,757,407 B2 | 6/2004 | Bruckstein et al. |
| 6,778,223 B2 | 8/2004 | Abe |
| 6,792,434 B2 | 9/2004 | Moghaddam et al. |
| 6,807,231 B1 | 10/2004 | Wiegand et al. |
| 6,816,836 B2 | 11/2004 | Basu et al. |
| 6,847,980 B1 | 1/2005 | Benitez et al. |
| 6,879,703 B2 | 4/2005 | Lin et al. |
| 6,886,013 B1 | 4/2005 | Beranek |
| 6,940,910 B2 | 9/2005 | Jun et al. |
| 6,941,325 B1 | 9/2005 | Benitez et al. |
| 6,950,542 B2 | 9/2005 | Roesch |
| 6,970,602 B1 | 11/2005 | Smith et al. |
| 7,010,751 B2 | 3/2006 | Shneiderman |
| 7,072,398 B2 | 7/2006 | Ma |
| 7,093,028 B1 | 8/2006 | Shao et al. |
| 7,103,225 B2 | 9/2006 | Yang et al. |
| 7,143,434 B1 | 11/2006 | Paek et al. |
| 7,145,946 B2 | 12/2006 | Lee |
| 7,154,560 B1 | 12/2006 | Chang et al. |
| 7,184,959 B2 | 2/2007 | Gibbon et al. |
| 7,185,049 B1 | 2/2007 | Benitez et al. |
| 7,254,285 B1 | 8/2007 | Paek et al. |
| 7,308,443 B1 | 12/2007 | Lee et al. |
| 7,313,269 B2 | 12/2007 | Xie et al. |
| 7,327,885 B2 | 2/2008 | Divakaran et al. |
| 7,339,992 B2 | 3/2008 | Chang et al. |
| 7,386,806 B2 | 6/2008 | Wroblewski |
| 7,398,275 B2 | 7/2008 | Rising et al. |
| 7,403,302 B2 | 7/2008 | Gann |
| 7,406,409 B2 | 7/2008 | Otsuka et al. |
| 7,409,144 B2 | 8/2008 | McGrath et al. |
| 7,437,004 B2 | 10/2008 | Baatz et al. |
| 7,496,830 B2 | 2/2009 | Rubin et al. |
| 7,519,217 B2 | 4/2009 | Liu et al. |
| 7,574,409 B2 | 8/2009 | Patinkin |
| 7,624,337 B2 | 11/2009 | Sull et al. |
| 7,636,662 B2 | 12/2009 | Dimtrova et al. |
| 7,653,264 B2 | 1/2010 | Hero et al. |
| 7,653,635 B1 | 1/2010 | Paek et al. |
| 7,676,820 B2 | 3/2010 | Snijder et al. |
| 7,720,851 B2 | 5/2010 | Chang et al. |
| 7,733,956 B1 | 6/2010 | Kalra et al. |
| 7,738,550 B2 | 6/2010 | Kuhn |
| 7,756,338 B2 | 7/2010 | Wilson et al. |
| 7,773,813 B2 | 8/2010 | Hua et al. |
| 7,809,192 B2 | 10/2010 | Gokturk et al. |
| 7,817,722 B2 | 10/2010 | Chang et al. |
| 7,817,855 B2 | 10/2010 | Yuille et al. |
| 7,860,317 B2 | 12/2010 | Xie et al. |
| 7,884,567 B2 | 2/2011 | Kim et al. |
| 7,996,762 B2 | 8/2011 | Qi et al. |
| 8,010,296 B2 | 8/2011 | Loo et al. |
| 8,019,763 B2 | 9/2011 | Wang et al. |
| 8,135,221 B2 | 3/2012 | Jiang et al. |
| 8,145,677 B2 | 3/2012 | Al-Shameri |
| 8,218,617 B2 | 7/2012 | Kim et al. |
| 8,332,333 B2 | 12/2012 | Agarwal |
| 8,520,949 B1 | 8/2013 | Bissacco et al. |
| 2001/0000962 A1 | 5/2001 | Rajan |
| 2002/0021828 A1 | 2/2002 | Papier et al. |
| 2002/0118748 A1 | 8/2002 | Inomata et al. |
| 2002/0124104 A1 | 9/2002 | Rappaport et al. |
| 2002/0157116 A1 | 10/2002 | Jaisinschi |
| 2002/0169771 A1 | 11/2002 | Melmon et al. |
| 2003/0013951 A1 | 1/2003 | Stefanescu et al. |
| 2003/0046018 A1 | 3/2003 | Kohlmorgen et al. |
| 2003/0195883 A1 | 10/2003 | Mojsilovic et al. |
| 2003/0229278 A1 | 12/2003 | Sinha |
| 2004/0057081 A1 | 3/2004 | Kubota |
| 2004/0131121 A1 | 7/2004 | Dumitras et al. |
| 2004/0210819 A1 | 10/2004 | Alonso |
| 2005/0076055 A1 | 4/2005 | Mory et al. |
| 2005/0201619 A1 | 9/2005 | Sun et al. |
| 2005/0210043 A1 | 9/2005 | Manasse |
| 2005/0238238 A1 | 10/2005 | Xu et al. |
| 2006/0026588 A1 | 2/2006 | Illowsky et al. |
| 2006/0167784 A1 | 7/2006 | Hoffberg |
| 2006/0200260 A1 | 9/2006 | Hoffberg et al. |
| 2006/0206882 A1 | 9/2006 | Illowsky et al. |
| 2006/0224532 A1 | 10/2006 | Duan et al. |
| 2006/0258419 A1 | 11/2006 | Winkler et al. |
| 2006/0293921 A1 | 12/2006 | McCarthy et al. |
| 2007/0033170 A1 | 2/2007 | Sull et al. |
| 2007/0038612 A1 | 2/2007 | Sull et al. |
| 2007/0044010 A1 | 2/2007 | Sull et al. |
| 2007/0047816 A1 | 3/2007 | Graham et al. |
| 2007/0078846 A1 | 4/2007 | Gulli et al. |
| 2007/0087756 A1 | 4/2007 | Hoffberg |
| 2007/0165904 A1 | 7/2007 | Nudd et al. |
| 2007/0174790 A1 | 7/2007 | Jing et al. |
| 2007/0195106 A1 | 8/2007 | Lin et al. |
| 2007/0217676 A1 | 9/2007 | Grauman et al. |
| 2007/0237426 A1 | 10/2007 | Xie et al. |
| 2007/0245400 A1 | 10/2007 | Paek et al. |
| 2008/0055479 A1 | 3/2008 | Shehata et al. |
| 2008/0082426 A1 | 4/2008 | Gokturk et al. |
| 2008/0097939 A1 | 4/2008 | Guyon et al. |
| 2008/0181308 A1 | 7/2008 | Wang et al. |
| 2008/0193016 A1 | 8/2008 | Lim et al. |
| 2008/0222670 A1 | 9/2008 | Lee et al. |
| 2008/0266300 A1 | 10/2008 | Deering et al. |
| 2008/0298464 A1 | 12/2008 | Hinz et al. |
| 2008/0303942 A1 | 12/2008 | Chang et al. |
| 2008/0304743 A1 | 12/2008 | Tang et al. |
| 2009/0055094 A1 | 2/2009 | Suzuki |
| 2009/0132561 A1 | 5/2009 | Cormode et al. |
| 2009/0290635 A1 | 11/2009 | Kim et al. |
| 2009/0316778 A1 | 12/2009 | Kim et al. |
| 2010/0082614 A1 | 4/2010 | Yang et al. |
| 2010/0172591 A1 | 7/2010 | Ishikawa |
| 2010/0205509 A1 | 8/2010 | Kirschner et al. |
| 2010/0332210 A1 | 12/2010 | Birdwell et al. |
| 2011/0025710 A1 | 2/2011 | Kennedy et al. |
| 2011/0064136 A1 | 3/2011 | Chang et al. |
| 2011/0081892 A1 | 4/2011 | Graham et al. |
| 2011/0093492 A1 | 4/2011 | Sull et al. |
| 2011/0145232 A1 | 6/2011 | Chang et al. |
| 2011/0238698 A1 | 9/2011 | Asikainen et al. |
| 2011/0283111 A1 | 11/2011 | Bister et al. |
| 2011/0314367 A1 | 12/2011 | Chang et al. |
| 2012/0089552 A1 | 4/2012 | Chang et al. |
| 2012/0109858 A1 | 5/2012 | Makadia et al. |
| 2014/0064091 A1 | 3/2014 | Basso et al. |

FOREIGN PATENT DOCUMENTS

| | | |
|---|---|---|
| EP | 0953938 | 11/1999 |
| JP | 2004049471 | 2/1992 |
| JP | 1996317384 | 11/1996 |
| WO | WO98/33323 | 7/1998 |
| WO | WO00/28440 | 5/2000 |
| WO | WO00/49797 | 8/2000 |

OTHER PUBLICATIONS

U.S. Appl. No. 11/448,114, Nov. 21, 2011 Final Office Action.
U.S. Appl. No. 10/965,040, Nov. 2, 2011 Notice of Appeal.

(56) References Cited

OTHER PUBLICATIONS

U.S. Appl. No. 11/448,114, Jan. 2, 2013 Issue Fee payment.
U.S. Appl. No. 11/448,114, Oct. 2, 2012 Notice of Allowance.
U.S. Appl. No. 12/874,337, Aug. 23, 2012 Restriction Requirement.
U.S. Appl. No. 12/969,101, Dec. 21, 2012 Issue Fee payment.
U.S. Appl. No. 12/969,101, Oct. 9, 2012 Notice of Allowance.
U.S. Appl. No. 13/165,553, Nov. 23, 2012 Restriction Requirement.
U.S. Appl. No. 11/960,424, Dec. 31, 2012 Terminal Disclaimer Decision.
U.S. Appl. No. 11/960,424, Dec. 20, 2012 Response to Non-Final Office Action and Terminal Disclaimer filed.
U.S. Appl. No. 12/548,199, Feb. 12, 2013 Response to Non-Final Office Action.
U.S. Appl. No. 12/548,199, Oct. 16, 2012 Non-Final Office Action.
U.S. Appl. No. 11/846,088, Nov. 29, 2012 Response to Non-Final Office Action.
U.S. Appl. No. 11/615,120, Apr. 6, 2010 Issue Fee payment.
U.S. Appl. No. 11/615,120, Jan. 14, 2010 Notice of Allowance.
U.S. Appl. No. 11/615,120, Sep. 4, 2009 Response to Non-Final Office Action.
U.S. Appl. No. 11/615,120, May 4, 2009 Non-Final Office Action.
U.S. Appl. No. 12/574,716, Feb. 1, 2012 Issue Fee payment.
U.S. Appl. No. 12/574,716, Nov. 10, 2011 Notice of Allowance.
U.S. Appl. No. 10/965,040, Mar. 15, 2012 Notice of Allowance.
Amir et al., "IBM research TRECVID-2003 video retrieval system", *Proc. NIST Text Retrieval Conf. (TREC)*, 2003.
Anemueller et al., "Biologically motivated audio-visual cue integration for object categorization", *Proc. International Conference on Cognitive Systems*, 2008.
Barzelay et al., "Harmony in motion", *Proc. IEEE Conference Computer Vision and Pattern Recognition*, pp. 1-8, 2007.
Beal et al., "A graphical model for audiovisual object tracking", *IEEE Trans. Pattern Analysis and Machine Intelligence*, 25:828-836, 2003.
Chang et al., "Large-scale multimodal semantic concept detection for consumer video", *Proc. 9th ACM SIGMM International Workshop on Multimedia Information Retrieval*, 2007.
Chen et al., "Image categorization by learning and reasoning with regions", *Journal of Machine Learning Research*, 5:913-939, 2004.
Cristani et al., "Audio-visual event recognition in surveillance video sequences", *IEEE Trans. Multimedia*, 9:257-267, 2007.
Dalal et al., "Histograms of oriented gradients for human detection", *Proc. IEEE Conference Computer Vision and Pattern Recognition*, pp. 886-893, 2005.
Deng et al., "Unsupervised segmentation of color-texture regions in images and video", *IEEE Trans. Pattern Analysis and Machine Intelligence*, 23:800-810, 2001.
Friedman, et al., "Additive logistic regression: a statistical view of boosting", *Annals of Statistics*, 28:337-407, 2000.
Han et al. "Incremental density approximation and kernel-based bayesian filtering for object tracking", *Proc. IEEE Conference Computer Vision and Pattern Recognition*, pp. 638-644, 2004.
Hellman et al., "Probability of error, equivocation, and the chernoff bound", *IEEE Trans. on Information Theory*, 16(4):368-372, 1970.
Hershey et al., "Audio-vision: using audio-visual synchrony to locate sounds", *Proc. Advances in Neural Information Processing Systems*, 1999.
Iwano et al., "Audio-visual speech recognition using lip information extracted from side-face images", *EURASIP Journal on Audio, Speech, and Music Processing*, 2007.
Lowe "Distinctive image features from scale-invariant keypoints", *International Journal of Computer Vision*, 60:91-110, 2004.
Lucas, et al. "An iterative image registration technique with an application to stereo vision", *Proc. Imaging understanding workshop*, pp. 121-130, 1981.
Mallat et al., "Matching pursuits with time-frequency dictionaries", *IEEE Transaction on Signal Processing*, 41(2): 3397-3415, 1993.
Maron et al., "A framework for multiple-instance learning", *Proc. Advances in Neural Information Processing Systems*, pp. 570-576, 1998.

Naphade et al., "A factor graph fraemwork for semantic video indexing", *IEEE Trans on CSVT*, 12(1):40-52, 2002.
Ogle et al., "Fingerprinting to identify repeated sound events in long-duration personal audio recordings", *Proc. Int. Conf. Acoustics, Speech and Signal Processing*, pp. I-233-I-236, 2007.
Pack et al., "Experiments in constructing belief networks for image classification systems", *Proc. ICIP*, Vancouver, Canada, 2000.
Smith et al., "Multimedia semantic indexing using model vectors", *Proc. ICME*, 3:445-448, 2003.
Vasconcelos, eature selection by maximum marginal diversity: optimality and implications for visual recognition, *CVPR 1*:762-769, 2003.
Wang et al., "Learning Semantic Scene Models by Trajectory Analysis", *Proc. European Conference on Computer Vision*, pp. 110-123, 2006.
Wu, et al., "Multimodal information fusion for video concept detection," Proc. International Conference Image Processing, pp. 2391-2394, 2004.
Yang et al., "Region-based image annotation using asymmetrical support vector machine-based multiple-instance learning", *Proc. IEEE Conference Computer Vision and Pattern Recognition*, pp. 2057-2063, 2006.
Zhou et al., "Object tracking using sift features and mean shift," *Computer Vision and Image Understanding*, 113:345-352, 2009.
U.S. Appl. No. 11/448,114, May 16, 2012 Notice of Appeal.
U.S. Appl. No. 13/935,183, Jul. 3, 2013.
U.S. Appl. No. 12/861,377, Sep. 24, 2013 Non-Final Office Action.
U.S. Appl. No. 12/861,377, Aug. 7, 2013 Response to Restriction Requirement.
U.S. Appl. No. 13/205,044, Oct. 1, 2013 Issue Fee payment.
U.S. Appl. No. 13/205,044, Jul. 19, 2013 Notice of Allowance.
U.S. Appl. No. 13/165,553, Sep. 10, 2013 Response to Non-Final Office Action.
U.S. Appl. No. 12/548,199, Aug. 21, 2013 Amendment and Request for Continued Examination (RCE).
U.S. Appl. No. 11/846,088, Aug. 8, 2013 Amendment and Request for Continued Examination (RCE).
Bayram, et al., "Image Manipulation Detection with Binary similarity Measures", *Proc. EUSIPCO*, pp. 752-755 (2005).
Huang, et al., "Active Learning for Interactive Multimedia Retrieval", *Proceedings of the IEEE*, 96(4):648-667 (2008).
Lukas, et al., "Detecting Digital Image Forgeries Using Sensor Pattern Noise", *Proc. SPIE, Security, Stenography and Watermarking of Multimedia Contents VIII*, 60720Y, (2006).
Popescu, et al., "Exposing Digital Forgeries by Detecting Traces of Resampling", *IEEE Transactions on signal Processing*, 52(2):758-767 (2005).
U.S. Appl. No. 10/482,074 (Abandoned), filed Dec. 24, 2003.
U.S. Appl. No. 13/165,553, filed Jun. 21, 2011.
U.S. Appl. No. 09/423,770 (Abandoned), filed Nov. 12, 1999.
U.S. Appl. No. 10/333,030 (Abandoned), filed Jun. 6, 2003.
U.S. Appl. No. 09/623,277 (Abandoned), filed Sep. 1, 2000.
U.S. Appl. No. 10/149,685 (Abandoned), filed Jun. 13, 2002.
U.S. Appl. No. 09/359,836 (Abandoned), filed Jul. 23, 1999.
U.S. Appl. No. 10/491,460 (Abandoned), filed Apr. 1, 2004.
U.S. Appl. No. 11/506,060 (Abandoned), filed Aug. 16, 2006.
U.S. Appl. No. 10/482,074, Jun. 18, 2008 Notice of Abandonment.
U.S. Appl. No. 10/482,074, Nov. 14, 2007 Non-Final Office Action.
U.S. Appl. No. 10/965,040, May 13, 2011 Final Office Action.
U.S. Appl. No. 10/965,040, Feb. 25, 2011 Response to Non-Final Office Action.
U.S. Appl. No. 10/965,040, Oct. 29, 2010 Non-Final Office Action.
U.S. Appl. No. 11/448,114, Jul. 8, 2011 Non-Final Office Action.
U.S. Appl. No. 11/448,114, Apr. 27, 2011 Response to Non-Final Office Action.
U.S. Appl. No. 11/448,114, Oct. 28, 2010 Non-Final Office Action.
U.S. Appl. No. 11/448,114, Apr. 1, 2010 Amendment and Request for Continued Examination (RCE).
U.S. Appl. No. 11/448,114, Nov. 25, 2009 Final Office Action.
U.S. Appl. No. 11/448,114, Oct. 19, 2009 Response to Non-Compliant Response.
U.S. Appl. No. 11/448,114, Oct. 6, 2009 Notice of Non-Compliant Response.

(56) References Cited

OTHER PUBLICATIONS

U.S. Appl. No. 11/448,114, Aug. 12, 2009 Response to Non-Final Office Action.
U.S. Appl. No. 11/448,114, Mar. 16, 2009 Non-Final Office Action.
U.S. Appl. No. 09/423,770, Feb. 20, 2004 Notice of Abandonment.
U.S. Appl. No. 09/423,770, Jul. 2, 2003 Non-Final Office Action.
U.S. Appl. No. 10/333,030, Jun. 25, 2010 Notice of Abandonment.
U.S. Appl. No. 10/333,030, Sep. 22, 2009 Non-Final Office Action.
U.S. Appl. No. 10/333,030, Jul. 9, 2009 Amendment and Request for Continued Examination (RCE).
U.S. Appl. No. 10/333,030, Feb. 26, 2009 Final Office Action.
U.S. Appl. No. 10/333,030, Nov. 21, 2008 Response to Non-Final Office Action.
U.S. Appl. No. 10/333,030, May 22, 2008 Non-Final Office Action.
U.S. Appl. No. 10/333,030, Apr. 15, 2008 Supplemental Response to Notice of Non-Compliant.
U.S. Appl. No. 10/333,030, Apr. 10, 2008 Response to Notice of Non-Compliant.
U.S. Appl. No. 10/333,030, Feb. 15, 2008 Notice of Non-Compliant.
U.S. Appl. No. 10/333,030, Jan. 24, 2008 Amendment and Request for Continued Examination (RCE).
U.S. Appl. No. 10/333,030, Oct. 25, 2007 Final Office Action.
U.S. Appl. No. 10/333,030, Aug. 28, 2007 Response to Non-Final Office Action.
U.S. Appl. No. 10/333,030, Apr. 30, 2007 Non-Final Office Action.
U.S. Appl. No. 10/333,030, Mar. 20, 2007 Response to Non-Final Office Action.
U.S. Appl. No. 10/333,030, Dec. 20, 2006 Non-Final Office Action.
U.S. Appl. No. 09/423,409, Nov. 21, 2003 Notice of Allowance.
U.S. Appl. No. 09/423,409, Nov. 6, 2003 Response to Final Office Action.
U.S. Appl. No. 09/423,409, Aug. 7, 2003 Final Office Action.
U.S. Appl. No. 09/423,409, Jun. 2, 2003 Response to Non-Final Office Action.
U.S. Appl. No. 09/423,409, Dec. 10, 2002 Non-Final Office Action.
U.S. Appl. No. 09/623,277, Mar. 23, 2006 Notice of Abandonment.
U.S. Appl. No. 09/623,277, Aug. 10, 2005 Restriction Requirement.
U.S. Appl. No. 09/607,974, Jul. 9, 2004 Notice of Allowance.
U.S. Appl. No. 09/607,974, Apr. 26, 2004 Response to Non-Final Office Action.
U.S. Appl. No. 09/607,974, Dec. 11, 2003 Non-Final Office Action.
U.S. Appl. No. 09/607,974, Nov. 10, 2003 Request for Continued Examination (RCE).
U.S. Appl. No. 09/607,974, Sep. 3, 2003 Advisory Action.
U.S. Appl. No. 09/607,974, Jul. 30, 2003 Response to Final Office Action.
U.S. Appl. No. 09/607,974, May 9, 2003 Final Office Action.
U.S. Appl. No. 09/607,974, Apr. 4, 2003 Response to Notice of Informality or Non-Responsive Amendment.
U.S. Appl. No. 09/607,974, Feb. 24, 2003 Notice of Informal or Non-Responsive Amendment.
U.S. Appl. No. 09/607,974, Jan. 8, 2003 Response to Non-Final Office Action.
U.S. Appl. No. 09/607,974, Jul. 1, 2002 Non-Final Office Action.
U.S. Appl. No. 09/530,308, Apr. 20, 2006 Notice of Allowance.
U.S. Appl. No. 09/530,308, Jan. 23, 2006 Response to Non-Final Office Action.
U.S. Appl. No. 09/530,308, Oct. 20, 2005 Non-Final Office Action.
U.S. Appl. No. 09/530,308, Jul. 11, 2005 Filed Appeal Brief.
U.S. Appl. No. 09/530,308, May 12, 2005 Filed Notice of Appeal.
U.S. Appl. No. 09/530,308, Feb. 9, 2005 Final Office Action.
U.S. Appl. No. 09/530,308, Sep. 27, 2004 Response to Non-Final Office Action.
U.S. Appl. No. 09/530,308, Mar. 24, 2004 Non-Final Office Action.
U.S. Appl. No. 09/530,308, Jan. 12, 2004 Response to Non-Final Office Action.
U.S. Appl. No. 09/530,308, Oct. 2, 2003 Non-Final Office Action.
U.S. Appl. No. 09/530,308, Jul. 14, 2003 Response to Non-Final Office Action.
U.S. Appl. No. 09/530,308, Nov. 20, 2002 Non-Final Office Action.
U.S. Appl. No. 10/220,776, Aug. 23, 2004 Notice of Allowance.
U.S. Appl. No. 10/149,685, Feb. 7, 2008 Notice of Abandonment.
U.S. Appl. No. 10/149,685, Jul. 31, 2007 Non-Final Office Action.
U.S. Appl. No. 10/149,685, May 7, 2007 Response to Non-Final Office Action.
U.S. Appl. No. 10/149,685, Feb. 6, 2007 Non-Final Office Action.
U.S. Appl. No. 09/889,859, Mar. 22, 2004 Notice of Allowance.
U.S. Appl. No. 09/889,859, Jan. 12, 2004 Response to Non-Final Office Action.
U.S. Appl. No. 09/889,859, Sep. 10, 2003 Non-Final Office Action.
U.S. Appl. No. 09/359,836, Mar. 17, 2008 Notice of Abandonment.
U.S. Appl. No. 09/359,836, Aug. 10, 2007 Final Office Action.
U.S. Appl. No. 09/359,836, May 11, 2007 Response to Non-Final Office Action.
U.S. Appl. No. 09/359,836, Dec. 15, 2006 Non-Final Office Action.
U.S. Appl. No. 09/359,836, Sep. 21, 2006 Amendment and Request for Continued Examination (RCE).
U.S. Appl. No. 09/359,836, May 18, 2004 Final Office Action.
U.S. Appl. No. 09/359,836, Mar. 5, 2004 Response to Non-Final Office Action.
U.S. Appl. No. 09/359,836, Aug. 29, 2003 Non-Final Office Action.
U.S. Appl. No. 09/830,899, Nov. 4, 2009 Notice of Allowance.
U.S. Appl. No. 09/830,899, Oct. 1, 2009 Request for Continued Examination (RCE).
U.S. Appl. No. 09/830,899, Sep. 4, 2009 Notice of Allowance.
U.S. Appl. No. 09/830,899, Jun. 29, 2009 Response to Non-Final Office Action.
U.S. Appl. No. 09/830,899, Feb. 2, 2009 Non-Final Office Action.
U.S. Appl. No. 09/830,899, Dec. 22, 2008 Response to Non-Final Office Action.
U.S. Appl. No. 09/830,899, Oct. 9, 2008 Non-Final Office Action.
U.S. Appl. No. 09/830,899, Jul. 15, 2008 Amendment and Request for Continued Examination.
U.S. Appl. No. 09/830,899, May 16, 2007 Filed Reply Brief.
U.S. Appl. No. 09/830,899, Apr. 5, 2007 Examiner's Answer to Appeal Brief.
U.S. Appl. No. 09/830,899, Dec. 18, 2006 Filed Appeal Brief.
U.S. Appl. No. 09/830,899, Nov. 3, 2006 Filed Notice of Appeal.
U.S. Appl. No. 09/830,899, Jul. 3, 2006 Final Office Action and Examiner Interview.
U.S. Appl. No. 09/830,899, Apr. 13, 2006 Non-Final Office Action.
U.S. Appl. No. 09/830,899, Mar. 3, 2006 Filed Appeal Brief.
U.S. Appl. No. 09/830,899, Feb. 15, 2006 Notice of Defective Appeal Brief.
U.S. Appl. No. 09/830,899, Dec. 19, 2005 Filed Appeal Brief.
U.S. Appl. No. 09/830,899, Nov. 9, 2005 Pre-Appeal Brief Conference Decision.
U.S. Appl. No. 09/830,899, Oct. 17, 2005 Amendment, Notice of Appeal and Pre-Appeal Brief Request.
U.S. Appl. No. 09/830,899, Jul. 5, 2005 Final Office Action.
U.S. Appl. No. 09/830,899, Dec. 27, 2004 Response to Notice of Non-Compliant.
U.S. Appl. No. 09/830,899, Dec. 7, 2004 Notice of Non-Compliant.
U.S. Appl. No. 09/830,899, Jul. 6, 2004 Amendment and Request for Continued Examination (RCE).
U.S. Appl. No. 09/830,899, Mar. 12, 2004 Final Office Action.
U.S. Appl. No. 09/830,899, Dec. 11, 2003 Response to Non-Final Office Action.
U.S. Appl. No. 09/830,899, Aug. 13, 2003 Non-Final Office Action.
U.S. Appl. No. 10/491,460, Jul. 11, 2006 Notice of Abandonment.
U.S. Appl. No. 10/728,345, Jun. 15, 2010 Notice of Allowance.
U.S. Appl. No. 10/728,345, Mar. 10, 2010 Response to Non-Final Office Action.
U.S. Appl. No. 10/728,345, Dec. 24, 2009 Non-Final Office Action.
U.S. Appl. No. 10/728,345, Oct. 5, 2009 Amendment and Request for Continued. Examination (RCE).
U.S. Appl. No. 10/728,345, Jul. 9, 2009 Final Office Action.
U.S. Appl. No. 10/728,345, Apr. 9, 2009 Response to Non-Final Office Action.
U.S. Appl. No. 10/728,345, Dec. 10, 2008 Non-Final Office Action.
U.S. Appl. No. 10/728,345, Sep. 30, 2008 Response to Non-Final Office Action.
U.S. Appl. No. 10/728,345, Jun. 30, 2008 Non-Final Office Action.

(56) References Cited

OTHER PUBLICATIONS

U.S. Appl. No. 10/494,739, Oct. 10, 2007 Notice of Allowance.
U.S. Appl. No. 09/831,215, Sep. 6, 2006 Notice of Allowance.
U.S. Appl. No. 09/235,862, Oct. 25, 2002 Notice of Allowance.
U.S. Appl. No. 09/235,862, Oct. 21, 2002 Supplemental Response to Final Office Action.
U.S. Appl. No. 09/235,862, Oct. 10, 2002 Advisory Action.
U.S. Appl. No. 09/235,862, Sep. 30, 2002 Response to Final Office Action.
U.S. Appl. No. 09/235,862, Apr. 22, 2002 Final Office Action.
U.S. Appl. No. 09/235,862, Mar. 12, 2002 Response to Non-Final Office Action.
U.S. Appl. No. 09/235,862, Nov. 7, 2001 Non-Final Office Action.
U.S. Appl. No. 09/831,218, Mar. 1, 2006 Notice of Allowance.
U.S. Appl. No. 09/831,218, Feb. 10, 2006 Response to Final Office Action.
U.S. Appl. No. 09/831,218, Dec. 29, 2005 Final Office Action.
U.S. Appl. No. 09/831,218, Nov. 28, 2005 Response to Non-Final Office Action.
U.S. Appl. No. 09/831,218, Aug. 24, 2005 Non-Final Office Action.
U.S. Appl. No. 11/506,060, May 10, 2011 Final Office Action.
U.S. Appl. No. 11/506,060, Apr. 12, 2011 Response to Non-Final Office Action.
U.S. Appl. No. 11/506,060, Oct. 19, 2010 Non-Final Office Action.
U.S. Appl. No. 11/506,060, Mar. 3, 2010 Amendment and Request for Continued Examination (RCE).
U.S. Appl. No. 11/506,060, Nov. 18, 2009 Final Office Action.
U.S. Appl. No. 11/506,060, Aug. 13, 2009 Response to Non-Final Office Action.
U.S. Appl. No. 11/506,060, Mar. 11, 2009 Non-Final Office Action.
Infotouch: An Explorative Multi-Touch Interface for Tagged Photo Collections. Linkoping University. Purportedly posted to Youtube on May 31, 2007 (http://www.youtube.com/watch?v=DHMJJwouq51). p. 1.
Zavesky et al., "Low-Latency Query Formulation and Result Exploration for Concept-Based Visual Search,", ACM Multimedia Information Retrieval Conference, Oct. 2008, Vancouver, Canada; pp. 1-23.
Dimitrova et al., "Motion Recovery for Video Contect Classification,", Arizona State University, Temple; Transactions on Information Systems; Oct. 13, 1995; No. 4, pp. 408-439; New York, NY, U.S.A.
Chang et al., "Multimedia Search and Retrieval", Published as a chapter in Advances in Multimedia: System, Standard, and Networks, A. Puri and T. Chen (eds.). New York: Marcel Dekker, 1999; pp. 559-584.
M. Bierling, "Displacement Estimation by Hierarchical Block Matching", SPIE Visual Commun. & Image Processing (1988) vol. 1001; pp. 942-951.
Hirata et al., "Query by Visual Example, Content Based Image Retrieval, Advances in Database Technology—EDBT"; Lecture Notes in Computer Science (1992, A. Pirotte et al. eds.)vol. 580; pp. 56-71.
T. Minka, "An Image Database Browed that Learns from User Interaction" MIT Media Laboratory Perceptual Computing Section, TR#365 (1996); pp. 1-55.
W. Niblack et al. "The QBIC Project: Querying Images by Content Using Color, Texture and Shape" in Storage and Retrieval for Image and Video Databases, Wayne Niblack, Editor, Proc. SPIE 1908, pp. 173-181 (1993).
Saber et al., "Region-based shape matching for automatic image annotation and query-by-example" 8 Visual Comm. and Image Representation (1997) pp. 1-40.
Sun, et al., "Architectures for MPEG Compressed Bitstream Scaling." Transactions on Circuits and Systems for Video Technology, vol. 6(2), Apr. 1996.
MPEG-7 Requirements; Oct. 1998.
MPEG-7 Context and Objectives; Oct. 1998.
MPEG-7 Proposal Package Description; Oct. 1998.

Oomoto E et al: "OVID: design and implementation of a video-object database system" IEEE Transactions on Knowledge and Data Engineering, IEEE, Inc. New York, US, vol. 5, No. 4, Aug. 1993, pp. 629-643, XP002134326 ISSN: 1041-4347.
Chung-Sheng Li et al: "Multimedia content descriptioin in the InfoPyramid" Acoustics, Speech and Signal Processing, 1998. Porceedings of the 1998 IEEE International Conference on Seattle, WA, USA May 12-15, 1998, New York, NY USA, IEEE, US, May 12, 1998, pp. 3789-3792, XP010279595 ISBN: 0-7803-4428-6.
Bayram et al.: "Image Manipulation Detection,", Journal of Electronic Imaging 15(4), 041102, (Oct.-Dec. 2006).
Fridich et al.: "Detection of Copy-Move Forgery in Digital Images", *Proc. of DFRWS 2003*, Cleveland, OH, USA, Aug. 5-8, 2003.
Sato et al., "Video OCR: Indexing digital news libraries by recognition of superimposed captions", Multimedia Systems, 7:385-394, 1999.
Trier et al.m "Feature extraction methods for character recognition—A survey", Pattern Recognition, vol. 29, pp. 641-662, 1996.
Tse et al., "Global Zoom/Pan estimation and compensation for video compression" Proceedings of ICASSP 1991, pp. 2725-2728.
Zhong et al., "Structure analysis of sports video using domain models", IEEE International Conference on Multimedia and Expo., Aug. 22-25, 2001, Tokyo, Japan.
Akutsu et al., "Video indexing using motion vectors", SPIE Visual communications and Image Processing 1992, vol. 1818, pp. 1522-1530.
Arman et al., "Image processing on compressed data for large video databases", Proceedings of ACM Multimedia '93, Jun. 1993, pp. 267-272.
Smoliar et al., "Content-Based video indexing and Retrieval", IEEE Mulitmedia, Summer 1994, pp. 62-72.
Sawhney et al., "Model-Based 2D & 3D Dominant Motion Estimation of Mosaicking and Video Representation" Proc. Fifth Int'l Conf. Computer Vision, Los Alamitos, CA, 1995, pp. 583-590.
Yeung et al., "Video Browsing using clustering and scene transitions on compressed sequences" IS & T/SPIE Symposium Proceedings, Feb. 1995, vol. 2417, pp. 399-413.
Meng et al., "Scene change detection in a MPEG Compressed video Sequence" IS & T/SPIE Symposium proceedings, vol. 2419, Feb. 1995.
Zhong et al., "Clustering methods for video browsing and annotation" sotrage and retrieval for Still Image and Video Databases IV, IS&T/SPIE's electronic Images: science & Tech. 96, vol. 2670 (1996).
Shahraray, B. "Scene Change Detecton and Content-Based sampling of video Sequences" SPIE conf. Digital Image Compression: Algorithms and Technologies 1995, vol. 2419.
Leung et al., "Picture Retrieval by Content description", Journal of Information Science; No. 18, pp. 111-119, 1992.
Meng et al., "Tools for Compressed-Domain Video Indexing and Editing", SPIE conference on storage and retrieval for Image and video Database, vol. 2670 (1996).
Li et al., "Modeling of moving objects in a video database", Proceeding of IEEE International Conference on Multimedia Computing and systems, pp. 336-343; Jun. 1997.
Li et al., "Modeling video temporal relationships in an object database management system", IS&T/SPIE international Symposium on Electronic Imaging: Multimedia Computing and Networking, pp. 80-91, Feb. 1997.
Oria et al., "Modeling images for content-based queried: the DISIMA Approach", Second international Conference on Visual Information Systems, pp. 339-346: Jun. 1997.
Lin et al., "A Robust image authentication Method surviving JPEG lossy compression"; SPIE 1998; pp. 28-30.
Lin et al., "A Robust image authentication Method distinguishin JPEG compression form malicious manipulation"; CU/CRT Technical Report 486-97-119, Dec. 1997; pp. 1-43.
Walton, Steven, "Image authentication for a slippery new age, knowing when images have been changed", Dr. Dobb's 1995.
Schneider et al., "A Robust content based digital sugnature for image authentication", Columbia University, Image and Advanced Television Laboratory, NY; 1996; pp. 227-230.

(56) References Cited

OTHER PUBLICATIONS

Li et al., "Issues and solutions for authenticating MPEG video", Columbia University, Department of Electrical Engineering, NY, Jan. 1999; pp. 54-65.
Kliot et al., "Invariant-Based shape retrieval in pictorial databases", Computer Vision and Image Understanding; Aug. 1998; 71(2): 182-197.
Schmid et al., "Local grayvalue invariants for image retrieval" IEEE Transaction on Pattern Analysis and Machine Intelligence; May 1997; 19(5): 530-535.v.
Cox et al., "Secure spread spectrum watermaking for multimedia", NEC Research Institute, Technical Report 95-10, Dec. 4, 1995; pp. 1 of 1 and 1-33.
Jacobs et al., "Fast Multiresolution Image Querying," Proc of SIGGRAPH, Los Angeles (Aug. 1995) pp. 277-286.
Kato et al., "Sketch Retrieval Method for Full Color Image Database—Query by Visual Example," Electro Technical Laboratory, MIDI, Tsukuba 305, Japan, IEEE (1992) pp. 530-532.
Netravali et al., Digital Pictures: Representation, Compression, and Standards, 2d. Ed., Plenum Press, New York and London (1995) pp. 340-344.
Del Bimbo et al., "Visual Image Retrieval by Elastic Matching of User Sketches," 19 IEEE Trans. on PAMI (1997) pp. 121-123.
Tong et al., "Rubric—An Environment for Full Text Information Retrieval," ACM, Jun. 1985, pp. 243-251.
Hjelsvold et al., "Searching and Browsing a Shared Video Database," IEEE, Aug. 1995, pp. 90-98.
Chabane Djeraba and Marinette Bouet "Digital Information Retrieval," Copyright 1997 ACM 0-89791-970-x/97/11 pp. 185-192.
Gong et al. (1995) "Automatic Parsing of TV Soccer Programs," IEEE, pp. 167-174.
John R. Smith (1999) "Digital Video Libraries and the Internet," IEEE, pp. 92-97.
Tonomura et al. (1990) "Content Oriented Visual Interface Using Video Icons for Visual Database Systems," Journal of Visual Languages and Computing, pp. 183-198.
Gunsel et al. (1998) "Temporal Video Segmentation Using Unsupervised Clustering and Semantic Object Tracking," Journal of Electronic Imaging 7(3), pp. 592-604.
Yoshinobu Tonomura (1991) "Video Handling Based on Structured Information for Hypermedia Systems," Proceedings of the International Conference on Multimedia Information Systems, pp. 333-344.
AMOS: An Active System for MPEG-4 Video Object Segmentation, Di Zhong and Shih-Chang, 647-651, o-8186-8821-1/98 (c) 1998 IEEE.
Gong Y. et al. A Generic Video Parsing System with a Scene Description Language (SDL). Real-Time Imaging, Feb. 1996, vol. 2, No. 1, pp. 45-49.
Russ, John C. The Image Processing Handbook. Boca Raton, Florida: CRC Press. 1995, 2nd ed., pp. 361-376.
Chang, S.-F. et al. VideoQ: An Automated Content-Based Video Search System Using Visual Cues. Proceedings ACM Multimedia 97, Seattle, WA, Nov. 9-13, 1997, pp. 313-324.
Chang, S.-F. Content-Based Indexing and Retrieval of Visual Information. IEEE Signal Processing Magazine. Jul. 1997, vol. 14, No. 4, pp. 45-48.
Li, W. et al. Vision: A Digital Video Library, Proceedings of the 1st ACM International Conference on Digital Libraries, Bethesda, MD, Mar. 20-23, 1996, pp. 19-27.
International Search Report PCT/US09/047492, Aug. 27, 2009.
International Search Report PCT/US09/40029, May 29, 2009.
International Search Report PCT/US99/26125, Apr. 3, 2000.
International Search Report PCT/US02/39247, Dec. 12, 2003.
International Search Report PCT/US00/34803, Oct. 29, 2001.
International Search Report PCT/US99/26126, May 10, 2000.
International Search Report PCT/US02/16599, Nov. 22, 2002.
International Search Report PCT/US02/31488, Feb. 4, 2003.
International Search Report PCT/US99/26127, Apr. 6, 2000.
International Search Report PCT/US10/023494, Apr. 1, 2000.
International Search Report PCT/US99/04776, May 14, 1999.
International Search Report PCT/US04/28722, Jun. 1, 2005.
International Search Report PCT/US06/007862, Mar. 29, 2007.
International Search Report PCT/US00/02488, May 25, 2000.
International Search Report PCT/US00/018231, Oct. 4, 2000.
International Search Report PCT/US09/069237, Mar. 1, 2010.
International Search Report PCT/US99/022790, Feb. 24, 1999.
International Search Report PCT/US99/22264, Feb. 11, 2000.
International Search Report PCT/US01/22485, May 11, 2003.
International Search Report PCT/US98/09124, Oct. 8, 1998.
International Search Report PCT/US03/12858, Nov. 25, 2003.
Geiger et al., "Dynamic Programming for Detecting, Tracking, and Matching Deformable Contours" IEEE Transactions on Pattern Analysis and Machine Intelligence, 17(3): 294-302, Mar. 1, 1995, XP000498121 *Abstract*.
M. Schaar, H. Radha, Adaptive motion-compensation fine- granular-scalability (AMC-FGS) for wireless video, IEEE Trans. on CSVT, vol. 12, No. 6, 360-371, 2002.
A. M. Tourapis. "Enhanced Predictive Zonal Search for Single and Multiple Frame Motion Estimation," Proceedings of Visual Communications and Image Processing 2002 (VCIP-2002), San Jose, CA, Jan. 2002, pp. 1069-1079.
H.-Y. Cheong, A. M. Tourapis, "Fast Motion Estimation within the H.264 codec," in proceedings of ICME-2003, Baltimore, MD, Jul. 6-9, 2003.
B. Girod, A. Aaron, S. Rane and D. Rebollo-Monedero , "Distributed video coding," *Proc. of the IEEE*, Special Issue on Video Coding and Delivery, 2005; pp. 1-12.
Z. He, Y. Liang, L. Chen, I. Ahmad, and D. Wu, "Power-Rate-Distortion Analysis for Wireless Video Communication under Energy Constraints," IEEE Transactions on Circuits and Systems for Video Technology, Special Issue on Integrated Multimedia Platforms, 2004.
K. Lengwehasatit and A. Ortega, "Rate Complexity Distortion Optimization for Quadtree-Based DCT Coding",ICIP 2000, Vancouver,BC, Canada, Sep. 2000.
A. Ray and H. Radha, "Complexity-Distortion Analysis of 11.264/ JVT Decoder on Mobile Devices," Picture Coding Symposium (PCS), Dec. 2004.
H. Kim and Y. Altunbasak, "Low-complexity macroblock mode selection for the H.264/AVC encoders," IEEE Int. Conf. on Image Processing, Suntec City, Singapore, Oct. 2004.
X. Lu, E. Erkip, Y. Wang and D. Goodman, "Power efficient multimedia communication over wireless channels", IEEE Journal on Selected Areas on Communications, Special Issue on Recent Advances in Wireless Multimedia, vol. 21, No. 10, pp. 1738-1751, Dec. 2003.
Q. Zhang, W. Zhu, Zu Ji, and Y. Zhang, "A Power-Optimized Joint Source Channel Coding for Scalable Video Streaming over Wireless Channel", IEEE International Symposium on Circuits and Systems (ISCAS) 2001, May 2001, Sydney, Australia.
Y. Eisenberg, C. E. Luna, T. N. Pappas, R. Berry, A.K. Katsaggelos, Joint source coding and transmission power management for energy efficient wireless video communications, CirSysVideo(12), No. 6, Jun. 2002, pp. 411-424.
National's PowerWise™ technology. http://www.national.com/appinfo/power/powerwise.html , Nov. 11, 2002.
X. Zhou, E. Li, and Y.-K. Chen, "Implementation of H.264 Decoder on General-Purpose Processors with Media Instructions", in Proc. of SPIE Visual Communications and Image Processing, Jan. 2003.
T.-C. Chen, Y.-C. Huang and L.-G. Chen, "Full Utilized and Resuable Architecture for Fractional Motion Estimation of H.264/AVC", ICASSP2004, Montreal, Canada, May 17-21, 2004.
T. Chiang and Y.-Q. Zhang, "A New Rate Control Scheme Using Quadratic Rate Distortion Model," IEEE Trans. Circuits Syst. Video Technol., vol. 7, pp. 246-250, Feb. 1997.
G. J. Sullivan and T. Wiegand, Rate-Distortion Optimization for Video Compression IEEE Signal Processing Magazine, vol. 15, No. 6, pp. 74-90, Nov. 1998.
A. M. Tourapis, F. Wu, S. Li, "Direct mode coding for bi-predictive pictures in the JVT standard", ISCAS2003, vol. 2, 700-703, Thailand, 2003.

(56) References Cited

OTHER PUBLICATIONS

V. Lappalainen, A. Hallapuro, and T.D. Hämäläinen, "Complexity of Optimized H.26L Video Decoder Implementation," IEEE Trans. Circuits Syst. Video Technol., vol. 13, pp. 717-725. Jul. 2003.
T. Wedi; H.G. Musmann, Motion- and aliasing-compensated prediction for hybrid video codingPage(s): IEEE Trans. Circuits Syst. Video Technol., vol. 13, pp. 577-586. Jul. 2003.
T. Wiegand, G. J. Sullivan, G. Bjontegaard, A. Luthra, "Overview of the H.264/AVC Video Coding Standard," IEEE Trans. Circuits Syst. Video Technol., vol. 13, pp. 560-576. Jul. 2003.
Wang, et al. "Dynamic rate scaling of coded digital video for IVOD applications." Transactions on Consumer Electronics, vol. 44(3), Aug. 1998, pp. 743-749.
Wee, et al., "Field-to-frame transcoding with spatial and temporal downsampling." Proceedings of the 1999 International Conference on Image Processing, vol. 4, Oct. 1999.
Wee, et al., "Secure scalable streaming enabling transcoding without decryption." Proceedings of the 2001 International Conference on Image Processing, vol. 1 of 3, Oct. 2001.
Wee, et al., "Secure scalable video streaming for wireless networks." Proceedings of the 2001 IEEE International Conference on Acoustics, Speech, and Signal Process, vol. 4 of 6, May 2001, pp. 2049-2052.
Sorial, et al., "Selective requantization for transcoding of MPEG compressed video." Proceedings of the 2000 IEEE International Conference on Multimrdia and Expo, vol. 1, 2000, pp. 217-220.
Kim, et al., "Description of Utility function based on optimum transcoding" ISO/IEC JTC1/SC/ WG11 MPEG02/M8319, Apr. 2002.
Mukherjee, et al., "Structured scalable meta-formsats (SSM) for digital item adaptation" Proceedings of the SPIE, SPIE, Bellingham, VA, US, vol. 5018, Jan. 2003, pp. 148-167.
Friedman, G.L., "The Trustworthy Digital Camera: Restoring Credibility to the Photographic Image", IEEE Transactions on Consumer Electronics, 39(4): 905-910; Nov. 1, 1993, XP000423080.
Lee et al., A Watermarking Sequence Using Parities of Error Control Coding for Image Authentication and Correction, IEEE Transactions on Consumer electronics, 46(2): 313-317, May 2000, XP00110026.
Tuong Dao, IEEE Proceedings, ISBN: 0-8186-8464-X; pp. 88-97, especially pp. 88-90.
Sajda et al., "In a blink of an eye and a switch of a transistor: Cortically-cuopled computer vision", Journal of Latex Class Files, Jan. 2007, 6(1): 1-14.
Wang et al., "Columbia TAG System—Transductive Annotation by Graph Version 1.0", Columbia University Advent Technical Report #225-2008-3, Oct. 15, 2008, entire document.
U.S. Appl. No. 11/448,114, Jul. 9, 2012 Amendment and Request for Examination (RCE).
U.S. Appl. No. 10/965,040, Jun. 7, 2012 Issue Fee payment.
U.S. Appl. No. 12/969,101, May 24, 2012 Non-Final Office Action.
U.S. Appl. No. 11/846,088, Jun. 7, 2012 Non-Final Office Action.
U.S. Appl. No. 11/960,424, Jun. 29, 2012 Non-Final Office Action.
U.S. Appl. No. 11/846,088, Mar. 7, 2013 Final Office Action.
U.S. Appl. No. 12/548,199, Apr. 22, 2013 Final Office Action.
U.S. Appl. No. 12/874,337, May 22, 2013 Non-Final Office Action.
Belkin, et al., "Manifold Regularization: A Geometric Framework for Learning from Labeled and Unlabeled Examples", *Journal of Machine Learning Research 7*, pp. 2399-2434 (2006).
Ham, et al., "Semisupervised Alignment of Manifolds", *Proceedings of the Annual Conference on Uncertainty in Artificial Intelligence*, Z. Ghahramani and R. Cowell, EDS., 10: 8 pages (2005).
Zhu, "Semi-Supervised Learning with Graphs", *Canergie Mellon University*, 164 pages (2005).
U.S. Appl. No. 13/165,553, Jun. 20, 2013 Non-Final Office Action.
U.S. Appl. No. 11/960,424, Jun. 7, 2013 Issue Fee payment.
U.S. Appl. No. 12/861,377, Mar. 13, 2013 Restriction Requirement.

* cited by examiner

METHODS AND ARCHITECTURE FOR INDEXING AND EDITING COMPRESSED VIDEO OVER THE WORLD WIDE WEB

CROSS-REFERENCE TO RELATED APPLICATIONS

This application is a continuation of U.S. patent application Ser. No. 12/874,337, filed Sep. 2, 2010, which is a divisional of U.S. patent application Ser. No. 10/728,345, filed Dec. 4, 2003, which is a divisional of U.S. patent application Ser. No. 09/423,769 filed on Nov. 12, 1999, now U.S. Pat. No. 6,735,253, issued May 11, 2004, which is a U.S. National Stage application of PCT/US97/08266, filed May 16, 1997, the contents of which are hereby incorporated by reference in their entirety and from which priority is claimed.

NOTICE OF GOVERNMENT RIGHTS

The U.S. Government has certain rights in this invention pursuant to the terms of the National Science Foundation CAREER award IRI-9501266.

BACKGROUND OF THE INVENTION

I. Field of the Invention

The present invention relates to techniques for editing and parsing compressed digital information, and more specifically, to editing and parsing visual information in the compressed domain.

II. Description of the Related Art

With the increasing use of local area, wide area and global networks to spread information, digital video has become an essential component of many new media applications. The inclusion of video in an application often gives the application not only increased functional utility, but also an aesthetic appeal that cannot be obtained by text or audio information alone. However, while digital video greatly increases our ability to share information, it demands special technical support in processing, communication, and storage.

In order to reduce bandwidth requirements to manageable levels, video information is generally transmitted between systems in the digital environment the form of compressed bitstreams that are in a standard format, e.g., Motion JPEG, MPEG-1, MPEG-2, H.261 or H.263. In these compressed formats, the Discrete Cosine Transform ("DCT") is utilized in order to transform N×N blocks of pixel data, where n typically is set to eight, into the DCT domain where quantization is more readily performed. Run-length encoding and entropy coding (i.e., Huffman coding or arithmetic coding) are applied to the quantized bitstream to produce a compressed bitstream which has a significantly reduced bit rate than the original uncompressed source signal. The process is assisted by additional side information, in the form of motion vectors, which are used to construct frame or field-based predictions from neighboring frames or fields by taking into account the inter-frame or inter-field motion that is typically present.

In order to be usable by a receiving system, such coded bitstreams must be both parsed and decoded. For example, in the case of an MPEG-2 encoded bitstream, the bitstream must be parsed into slices and macroblocks before the information contained in the bitstream is usable by an MPEG-2 decoder. Parsed bitstream information may be used directly by an MPEG-2 decoder to reconstruct the original visual information, or may be subjected to further processing.

In the case of compressed digital video, further processing of video information can occur either in the normal, uncompressed domain or in the compressed domain. Indeed, there have been numerous attempts by others in the field to realize useful techniques for indexing and manipulating digital video information in both the uncompressed and compressed domains.

For example, in the article by S. W. Smoliar et al., "Content-Based Video Indexing and Retrieval," IEEE Multimedia, summer 1994, pp. 62-72, a color histogram comparison technique is proposed to detect scene cuts in the spatial (uncompressed) domain. In the article by B. Shahraray, "Scene Change Detection and Content-Based Sampling of Video Sequences," SPIE Conf. Digital Image Compression: Algorithms and Technologies 1995, Vol. 2419, a block-based match and motion estimation algorithm is presented.

For compressed video information, the article by F. Arman et al., "Image Processing on Compressed Data for Large Video Databases," Proceedings of ACM Multimedia '93, June 1993, pp. 267-272, proposes a technique for detecting scene cuts in JPEG compressed images by comparing the DCT coefficients of selected blocks from each frame. Likewise, the article by J. Meng et al., "Scene Change Detection in a MPEG Compressed Video Sequence," IS&T/SPIE Symposium Proceedings, Vol. 2419, February 1995, San Jose, Calif., provides a methodology for the detection of direct scene cuts based on the distribution of motion vectors, and a technique for the location of transitional scene cuts based on DCT DC coefficients. Algorithms disclosed in the article by M. M. Yeung, et al. "Video Browsing using Clustering and Scene Transitions on Compressed Sequences," IS&T/SPIE Symposium Proceedings, February 1995, San Jose, Calif. Vol. 2417, pp. 399-413, enable the browsing of video shots after scene cuts are located. However, the Similar et al., Shahraray, and Arman et al. references are limited to scene change detection, and the Meng et al. and Yeung et al. references do not provide any functions for editing compressed video.

Others in the field have attempted to address problems associated with camera operation and moving objects in a video sequence. For example, in the spatial domain, H. S. Sawhney, et al., "Model-Based 2D & 3D) Dominant Motion Estimation for Mosaicking and Video Representation," Proc. Fifth Int'l conf. Computer Vision, Los Alamitos, Calif., 1995, pp. 583-390, proposes to find parameters of an affine matrix and to construct a mosaic image from a sequence of video images. In similar vain, the work by A. Nagasaka et al., "Automatic Video Indexing and Full-Video Search for Object Appearances," in E. Knuth and L. M. Wegner, editors, Video Database Systems, II, Elsevier Science Publishers B. V., North-Holland, 1992, pp. 113-127, proposes searching for object appearances and using them in a video indexing technique.

In the compressed domain, the detection of certain camera operations, e.g., zoom and pan, based on motion vectors have been proposed in both A. Akutsu et al., "Video Indexing Using Motion Vectors," SPIE Visual Communications and Image Processing 1992, Vol. 1818, pp. 1522-1530, and Y. T. Tse et al., "Global Zoom/Pan Estimation and Compensation For Video Compression" Proceedings of ICASSP 1991, pp. 2725-2728. In these proposed techniques, simple three, parameter models are employed which require two assumptions, i.e., that camera panning is slow and focal length is long. However, such restrictions make the algorithms not suitable for general video processing.

There have also been attempts to develop techniques aimed specifically at digital video indexing. For example, in the aforementioned Smoliar et al. article, the authors propose using finite state models in order to parse and retrieve specific domain video, such as news video. Likewise, in A. Hampapur, et al., "Feature Based Digital Video Indexing," IFIP2.6 Visual Database Systems, III, Switzerland, March, 95, a feature based video indexing scheme using low level machine derivable indices to map into the set of application specific video indices is presented.

One attempt to enable users to manipulate image and video information was proposed by J. Swartz, et al., "A Resolution Independent Video Language," Proceedings of ACM Multimedia '95, pp. 179-188, as a resolution independent video language (Rivl). However, although Rivl uses group of pictures (GOPs) level direct copying whenever possible for "cut and paste" operations on MPEG video, it does not use operations in the compressed domain at frame and macroblock levels for special effects editing. Instead, most video effects in Rivl are done by decoding each frame into the pixel domain and then applying image library routines.

The techniques proposed by Swartz et al. and others which rely on performing some or all video data manipulation functions in the uncompressed domain do not provide a useful, truly comprehensive technique for indexing and manipulating digital video. As explained in S.-P. Chang, "Compressed-Domain Techniques for Image/Video Indexing and Manipulation," IEEE Intern. Conf. on Image Processing, ICIP 95, Special Session on Digital Image/Video Libraries and Video-on-demand, October 1995, Washington D. C., the disclosure of which is incorporated by reference herein, the compressed-domain approach offers several powerful benefits.

First, implementation of the same manipulation algorithms in the compressed domain is much cheaper than that in the uncompressed domain because the data rate is highly reduced in the compressed domain (e.g., a typical 20:1 to 50:1 compression ratio for MPEG). Second, given most existing images and videos stored in the compressed form, specific manipulation algorithms can be applied to the compressed streams without full decoding of the compressed images/videos. In addition, because that full decoding and re-encoding of video are not necessary, manipulating video in the compressed domain avoids the extra quality degradation inherent in the reencoding process. Thus, as further explained in the article by the present inventors, I. Meng and S.-F. Chang, "Tools for Compressed-Domain Video Indexing and Editing," SPIE Conference on Storage and Retrieval for Image and Video Database, Vol. 2670, San Jose, Calif., February 1996, the disclosure of which is incorporated by reference herein, for MPEG compressed video editing, speed performance can be improved by more than 60 times and the video quality can be improved by about 3-4 dB if a compressed-domain approach is used rather than a traditional decode-edit-reencode approach.

A truly comprehensive technique for indexing and manipulating digital video must meet two requirements. First, the technique must provide for key content browsing and searching, in order to permit users to efficiently browse through or search for key content of the video without full decoding and viewing the entire video stream. In this connection, "key content" refers to key frames in video sequences, prominent video objects and their associated visual features (motion, shape, color, and trajectory), or special reconstructed video models for representing video content in a video scene. Second, the technique must allow for video editing directly in the compressed domain to allow users to manipulate an specific object of interest in the video stream without having to fully decode the video. For example, the technique should permit a user to cut and paste any arbitrary segment from an existing video stream to produce a new video stream which conforms to the valid compression format.

Unfortunately, none of the prior art techniques available at present are able to meet these requirements. Thus, the prior art techniques fail to permit users who want to manipulate compressed digital video information with the necessary tools to extract a rich set of visual features associated with visual scenes and individual objects directly from compressed video so as not only to enable content based query searches, but also to allow for integration with domain knowledge for derivation of higher-level semantics.

SUMMARY OF THE INVENTION

An object of the present invention is to provide comprehensive techniques for indexing and manipulating digital video in the compressed domain.

Another object of the present invention is to provide techniques for key content browsing and searching of compressed digital video without decoding and viewing the entire video stream.

A further object of the present invention is to provide techniques which allow for video editing directly in the compressed domain A still further object of the present invention is to provide tools that permit users who want to manipulate compressed digital video information to extract a rich set of visual features associated with visual scenes and individual objects directly from compressed video.

Yet another object of this invention is to provide an architecture which permits users to manipulate compressed video information over a distributed network, such as the Internet.

In order to meet these and other objects which will become apparent with reference to further disclosure set forth below, the present invention provides a method for detecting moving video objects in a compressed digital bitstream which represents a sequence of fields or frames of video information for one or more previously captured scenes of video. The described method advantageously provides for analyzing a compressed bistream to locate scene cuts so that at least one sequence of fields or frames of video information which represents a single video scene is determined. The method also provides for estimating one or more operating parameters of a camera which initially captured the video scene, by analyzing a portion of the compressed bitstream which corresponds to the video scene, and for detecting one or more moving video objects represented in the compressed bitstream by applying global motion compensation with the estimated camera operating parameters.

In a preferred process, the compressed bitstream is a bitstream compressed in accordance with the MPEG-1, MPEG-2, H261, or H263 video standard. In this preferred embodiment, analyzing can beneficially be accomplished by parsing the compressed bitstream into blocks of video information and associated motion vector information for each field or frame of video information which comprises the determined sequence of fields or frames of video information representative of said single scene, performing inverse motion compensation on each of the parsed blocks of video information to derive discrete cosign transform coefficients for each of the parsed blocks of video information, counting the motion vector information associated with each of the parsed blocks of video information, and determining from the counted motion vector information and discrete cosign transform coefficient information whether one of the scene cuts has occurred.

In an alternative embodiment, analyzing is performed by parsing the compressed bitstream into blocks of video information and associated motion vector information for each field or frame of video information which comprises the determined sequence of fields or frames of video information representative of the scene, and estimating is executed by approximating any zoom and any pan of the camera by determining a multi-parameter transform model applied to the parsed motion vector information. In an especially preferred process, the frame difference due to camera pan and zoom motion may be modeled by a six-parameter affirm transform which represents the global motion information representative of the zoom and pan of the camera.

The detecting step advantageously provides for computing local object motion for one or more moving video objects based on the global motion information and on one or more motion vectors which correspond to the one or more moving video objects. In addition, thresholding and morphological operations are preferably applied to the determined local object motion values to eliminate any erroneously sensed moving objects. Further, border points of the detected moving objects are determined to generate a bounding box for the detected moving object.

The present invention also provides for an apparatus for detecting moving video objects in a compressed digital bitstream which represents a sequence of fields or frames of video information for one or more previously captured scenes of video. Usefully, the apparatus includes means for analyzing the compressed bistream to locate scene cuts therein and to determine at least one sequence of fields or frames of video information which represents a single video scene, means for estimating one or more operating parameters for a camera which initially viewed the video scene by analyzing a portion of the compressed bitstream which corresponds to the video scene, and means for detecting one or more moving video objects represented in the compressed bitstream by applying global motion compensation to the estimated operating parameters.

A different aspect of the present invention provides techniques for dissolving an incoming scene of video information which comprises a sequence of fields or frame of compressed video information to an outgoing scene of video information, which comprises a sequence of fields or frame of compressed video information. This technique advantageously provides for applying DCT domain motion compensation to obtain DCT coefficients for all blocks of video information which make up a last frame of the outgoing video scene and the first frame of the incoming video scene, and for creating a frame in the dissolve region frame from the DCT coefficients of the last outgoing frame and the first incoming frame.

In an especially preferred arrangement, an initial value for a weighting function is selected prior to the creation of a first frame in the dissolve region and is used in the creation of the first frame in the dissolve region. The weighting value is then incremented, and a second dissolve frame from the DCT coefficients is generated.

In yet another aspect of the present invention, a technique for masking a compressed frame of digital video information is provided. The technique first determines whether the frame to be masked is intra-coded, predictive coded or bi-directionally predictive-coded. If the frame is intra-coded, the technique provides for extracting DCT coefficients for all blocks within the frame, examining a block to determine where in the frame the block is located, setting DCT coefficients for the block to zero if the block is outside the mask region, and applying a DCT cropping algorithm to the DCT coefficients if the block is on the boundary of the mask region.

If the frame is predictive-coded or bi-directionally predictive-coded, the technique provides for examining motion vectors associated with block, to determine whether they point to blocks outside or on the mask region, and reencoding the block if a motion vector points to blocks outside the boundary, or on, the mask region.

In still another aspect of the present invention, a technique for generating a frozen frame of video information from a sequence of frames of compressed video information is provided. The technique attractively provides for selecting a frame of compressed video information to be frozen, determining whether the frame to be frozen is intra-coded, predictive-coded or bi-directionally predictive-coded, and if the frame is not intra-coded, converting it to become intra-coded, creating duplicate predictive-coded frames, and arranging the intra-coded frame and the duplicate predictive-coded frames into a sequence of compressed frames of video information.

In yet a further aspect of the present invention, a system for editing compressed video information over a distributed network is provided. The system includes a client computer, a network link for permitting said client computer to search for and locate compressed video information on said distributed network, and tools for editing a compressed bitstream of video information over the distributed network.

The accompanying drawings, which are incorporated and constitute part of this disclosure, illustrate a preferred embodiment of the invention and serve to explain the principles of the invention.

DESCRIPTION OF THE PREFERRED EMBODIMENTS

Figure 1:
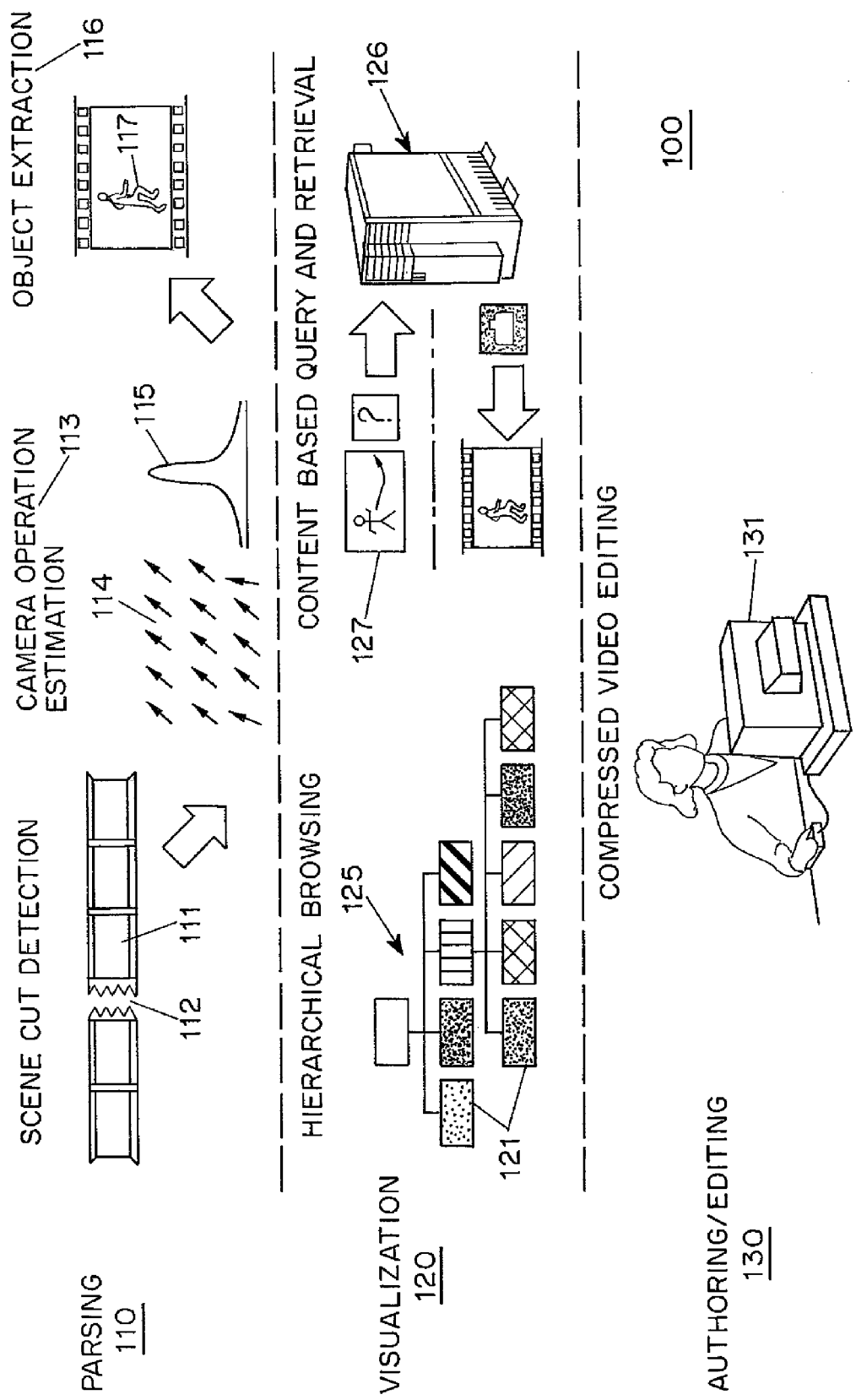
FIG. 1 illustrates a system in accordance with one aspect of the present invention.

Referring to FIG. 1, an exemplary embodiment of our invention which permits a user to edit and parse visual information in the compressed domain is provided. The architecture of the system 100 is broadly arranged into three functional modules, a parsing module 110, a visualization module 120, and an authoring and editing module 130.

In the parsing module, an incoming bitstream of compressed video information 111 which may be, for example, an MPEG-2 compressed bitstream is examined for scene cuts 112 and broken into shot segments, where each segment includes one or more fields or frames of compressed video information. In an MPEG-2 bitstream, the shot segments will be made of three types of fields or frames, i.e., Intra-coded ("I") fields which are coded independently and entirely without reference to other fields, Predictive-coded ("P") fields which are coded with reference to temporally preceding I or P fields in the sequence, and Bi-directionally predictive-coded ("B") fields which are coded with reference to the nearest preceding and/or future I or P fields in the sequence. The bistream will also include associated motion vector information for the P and B fields which "point" to blocks of video information in a preceding or succeeding field or frame which are needed to reconstruct the compressed field or frame of video information.

The parsing module compiles a list of scene cuts which are useful for indexing the compressed video information. The individual shot segments are next analyzed 113 in order to derive camera operation parameters. In FIG. 1, the vector field 114 is representative of the pan of the camera which originally captured the video information which is being analyzed. Histogram 115 is used to detect the pan of the camera. Based on the derived operating parameters, moving objects 117 within the compressed video information 116 are detected and shape and trajectory features for such moving objects are extracted.

In the visualization module 120, the complied list of scene cuts and the derived camera zoom and pan information are used to extract key frames 121 which represent each video shot. The key frames 121 are placed in a hierarchical arrangement 125 so that they may be readily browsed with a hierarchical video scene browser, such as the browser described in D. Zhong et al., "Clustering Methods for Video Browsing and Annotation," Storage and Retrieval for Still Image and Video Databases IV, IS&T/SPIE's Electronic Images: Science & Tech. 96, Vol 2670 (1996). A content-based image query system 126 may then be used to index and retrieve key frames or video objects based on their visual features and spatial layout.

In the authoring and editing module 130, software tools are provided to not only enable a user to cut and past arbitrary compressed video segments to form new video segments, but also to add special effects to such video segments, such as dissolve, key, masking and motion effects.

Figure 2:
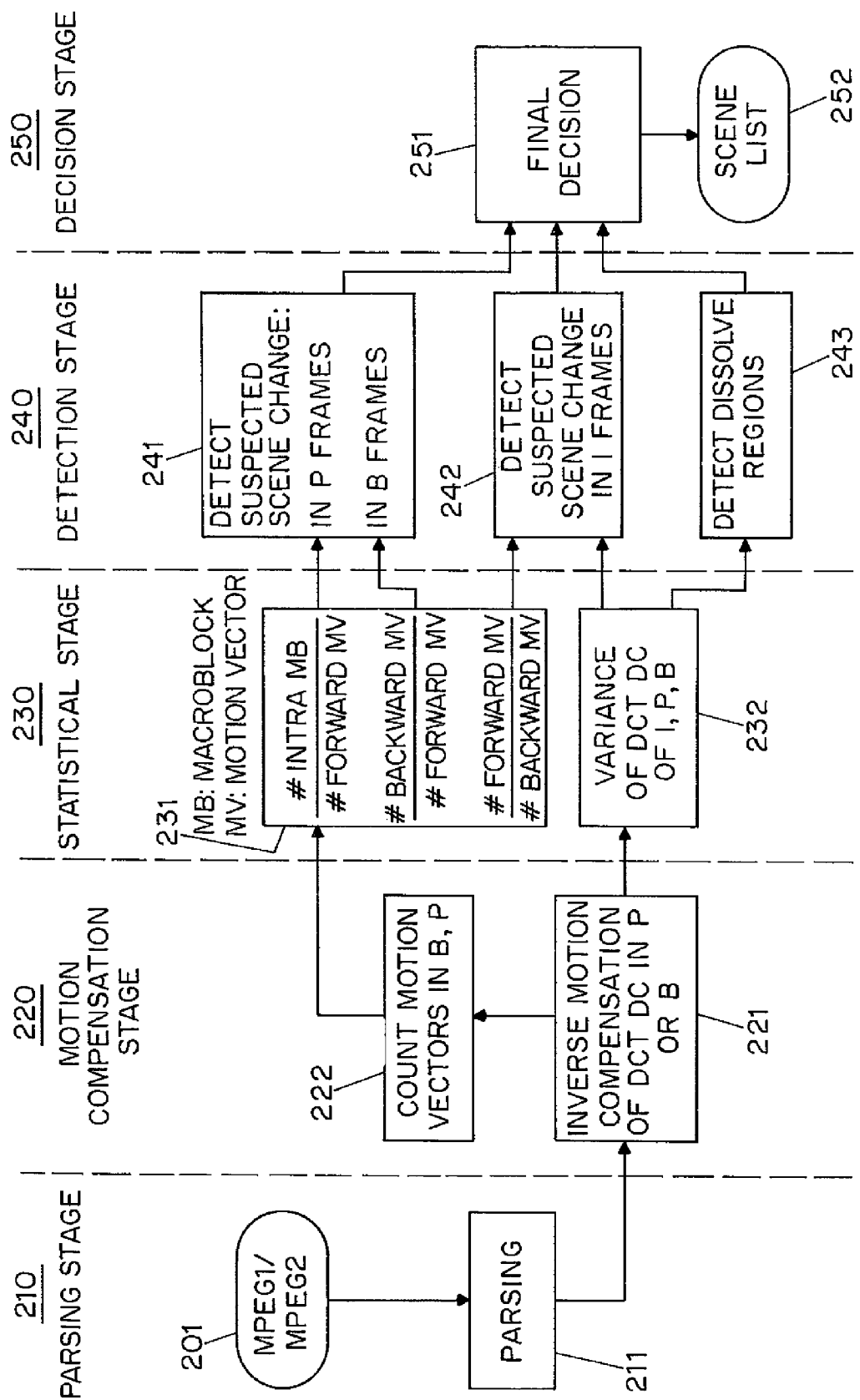
FIG. 2. is a flowchart which illustrates how a scene cut is detected in accordance with one aspect of the present invention.

The parsing module 110 is explained in further detail with reference to the FIGS. 2 and 3. Although the preferred steps executed e.g. on a computer 131 to locate scene cuts in a compressed bitstream are fully disclosed in the above referenced article by Meng et al., the disclosure of which is incorporated by reference herein, that technique is now described with reference to FIG. 2.

An MPEG-1 or MPEG-2 compressed bitstream 201 that is received by the parsing module 110 is first subjected to parsing 210. Such a bitstream represents an arrangement of N×N blocks of video information that are broadly organized into macroblocks, where each macroblock is defined by four blocks of luminance information and one block of chrominance information, and further organized into slices which represent contigous sequences of macroblocks of video information in raster scan order. The N×N blocks of video information are preferably 8×8 blocks. The bitstream also represents associated motion vector information and prediction error difference information which are needed to reconstruct original blocks of video information.

In the parsing stage 210, the bitstream, is parsed down to the fundamental block level by parsing techniques known to those skilled in the art 211. The parsed blocks of video information are still in compressed format and are thus represented by Direct Cosign Trasform ("DCT") coefficients which have been quantized, Zig-Zag nm-length encoded and variable length coded, as those skilled in the art will appreciate.

In the inverse motion compensation stage 220, the parsed blocks of video information which belong to P and B frames are then subjected to inverse motion compensation 220 by using the associated motion vector information to locate reference blocks of video information and reconstruct the DCT coefficients of blocks of video information in the B and P frames. In this step 220, only the first (the "DC") DCT coefficients are used. Motion vectors associated with the B and P frames are counted 222 for each frame in the sequence.

In the Statistical Stage 230, three ratios, i.e., the number of intra-coded macroblocks to the number of forward motion vectors, the number of backward motion vectors to the number of forward motion vectors, and the number of forward motion vectors to the number of backward motion vectors, are calculated 231 in order to detecting direct scene cuts in P, B, and I frames, respectively. In this stage, the fact that most video shots of compressed MPEG video are formed by consecutive P, I and B frames that have a high degree of temporal correlation is taken advantage of. For P and B frames, this correlation is characterized by the ratio of the number of backward motion vectors, or intracoded macroblocks, to the number of forward motion vectors. For example, when a direct scene cut occurs on a P-frame, most macroblocks will be intracoded (i.e., no interframe prediction).

Also in the statistical stage 230 the variance of the DCT DC coefficients of Luminance in the I, P and B frames is determined 232. As those skilled in the art will appreciate.

Next, in the detection stage 240, the ratios calculated in 231 are compared to local adaptive thresholds in order to detect the peak values 241. For P frames, the ratio of the number of intra-coded macroblocks to the number of forward motion vectors is examined. For B frames, the ratio of the number of backward motion vectors to the number of forward motion vectors is examined.

Also in the detection stage 240, the variance of DCT DC coefficients calculated for I and P frames in 232 is used in two ways. For I frames, this variance information is used together with the ratio of the number of forward motion vectors to the number of backward motion vectors determined in 231 in order to detect candidate scene changes 242. If the ratio is above a predetermined threshold, the frame is marked as containing a suspected scene cut. If the variable information is much different than was the variance information for the immediately preceding I frame, a suspected scene cut is likewise detectable. The variance information is also used directly to detect dissolve regions, i.e. regions where one scene is fading out and a second is fading in 243 by examining the parabolic curve of the variance information.

In the decision stage 250, duplicate detections of scene cuts are eliminated 251 before list of scenes 252 is determined. In addition, if a suspected scene change occurs within a time threshold T rejection of a previously detected scene change, no scene change is recorded.

With scene cuts detected, the bitstream is broken into scenes or "shots" which represent different sets of visual information that may be of interest to a user. The next block of our parsing module 110, camera operating estimation 113, examines the individual shots for recognizable information which is highly useful in indexing the different shots which have been parsed.

In particular, certain low level visual features such as camera zoom and pan, and the presence of moving visual objects are useful information for video indexing. Camera zoom and pan, which give the global motion of the shot being analyzed, can be estimated with a 6-parameter affine transform model by using the actual motion vectors from the MPEG compressed stream.

The motion vectors in MPEG are usually generated by block matching: finding a block in the reference frame so that the mean square error of prediction is minimized. Although the motion vectors do not represent the true optical flow, it is still good in most cases to estimate the camera parameters in sequences that do not contain large dark or uniform regions.

When the distance between the object or background and the camera is large, a 6 parameter affine transform can be used to describe the global motion of the current frame:

$$\begin{bmatrix} u \\ v \end{bmatrix} = \begin{bmatrix} 1 & x & y & 0 & 0 & 0 \\ 0 & 0 & 0 & 1 & x & y \end{bmatrix} \cdot [a_1 \ a_2 \ a_3 \ a_4 \ a_5 \ a_6]^T \quad (1)$$

where (x, y) is the coordinate of a macroblock in the current frame, $[u \ v]^T$ is the motion vector associated with that macroblock, and $[a_1 \ a_2 \ a_3 \ a_4 \ a_5 \ a_6]^T$ is the affine transform vector. In order to simplify the mathematics, the following variables can be defined:

U for $[u, v]^T$ $$X \text{ for } \begin{bmatrix} 1 & x & y & 0 & 0 & 0 \\ 0 & 0 & 0 & 1 & x & y \end{bmatrix},$$

and â for $[a_1 \ a_2 \ a_3 \ a_4 \ a_5 \ a_6]$.

Given the motion vector for each macroblock, a global parameter can be determined using Least Squares ("LS") estimation by finding a set of parameters to â minimize the error between the motion vectors estimated in (1) and the actual motion vectors obtained from the MPEG stream:

$$S(\bar{a}) = \sum_X \sum_Y [(\hat{u}_{xy} - u_{xy})^2 + (\hat{v}_{xy} - v_{xy})^2] \quad (2)$$

In equation (2), $[\hat{u}, \hat{v}]^T$ is the estimated motion vector. â is then solved for by setting the first derivative of S(â) to 0 to get;

$$\begin{bmatrix} N & A & B \\ A & C & E \\ B & E & D \end{bmatrix} \cdot \begin{bmatrix} a_1 \\ a_2 \\ a_3 \end{bmatrix} = \begin{bmatrix} U_1 \\ U_2 \\ U_3 \end{bmatrix} \text{ and } \begin{bmatrix} N & A & B \\ A & C & E \\ B & E & D \end{bmatrix} \cdot \begin{bmatrix} a_4 \\ a_5 \\ a_6 \end{bmatrix} = \begin{bmatrix} V_1 \\ V_2 \\ V_3 \end{bmatrix} \quad (3)$$

where, $$N = \sum_x \sum_y 1, \ A = \sum_x \sum_y x, \ B = \sum_x \sum_y y,$$

$$C = \sum_x \sum_y x^2, \ D = \sum_x \sum_y y^2, \ E = \sum_x \sum_y x \cdot y,$$

$$U_1 = \sum_x \sum_y u_{xy}, \ U_2 = \sum_x \sum_y u_{xy} \cdot x, \ U_3 = \sum_x \sum_y u_{xy} \cdot y,$$

$$V_1 = \sum_x \sum_y v_{xy}, \ V_2 = \sum_x \sum_y v_{xj} \cdot x, \ V_3 = \sum_x \sum_y v_{xy} \cdot y.$$

All summations are computed over all valid macroblocks whose motion vectors survive after the nonlinear noise reduction process. (For example, median filter.) This process is used to eliminate obvious noise in the motion vector field. After the first LS estimation, motion vectors that have large distance from the estimated ones are filtered out before a second LS estimation. The estimation process is preferably iterated several times to refine the accuracy.

Figure 3:
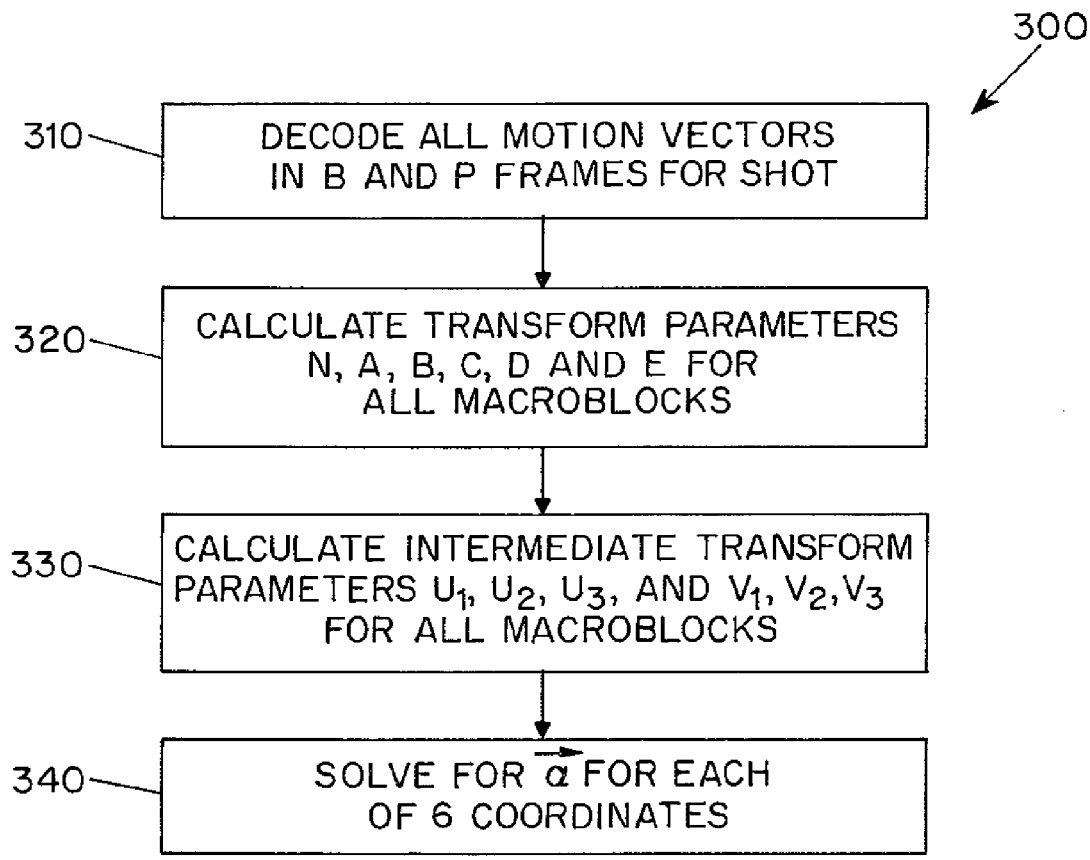
FIG. 3. is a flowchart which illustrates how camera parameters are estimated in accordance with one aspect of the present invention.

Referring to FIG. 3, the foregoing process to determine a global motion parameter is illustrated in flow diagram 300. In step 310, each motion vector associated with the B and P frames contained in the shot are decoded. The intermediate variables N, A, B, C, D, and E are interactively calculated using the x and y coordinates for each macroblock in the current frame of video being analyzed 320, Next, intermediate transform parameters $u_1, u_2, u_3, v_1, v_2, v_3$ are calculated using the decoded motion vectors and the x and y coordinates for such macroblocks 330. Finally, the vector â is solved for by solving for the matrix inverse operation 340.

Figure 4:
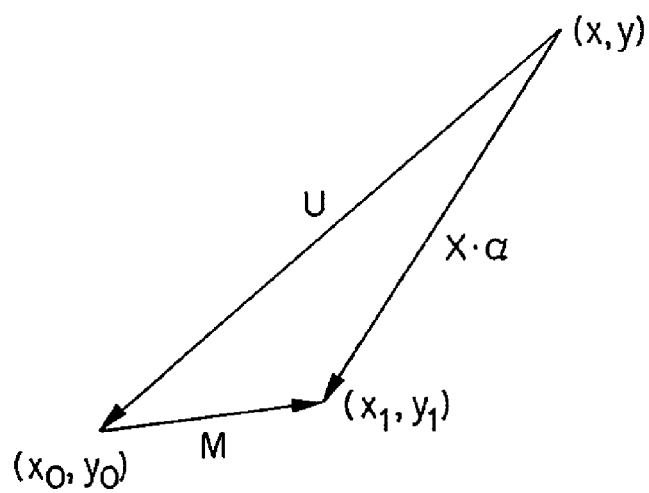
FIG. 4 is a vector diagram which serves to explain global and local motion.

After the global camera parameters â are found, object motion can be extracted by applying global motion compensation. Referring to FIG. 4, if an object located at (x, y) in the current frame moves from $(x_0, y_0)$ to $(x_1, y_1)$ in the reference frame with motion vector U, then U+M=X·â. Thus, the motion of the local object can be recovered from its associated motion vectors as follows:

$$M = X \cdot \hat{a} - U \quad (4)$$

Figure 5A:
FIG. 5 depicts an exemplary frame of compressed video information and motion vectors for the frame.
Figure 5B:
Figure 5C:
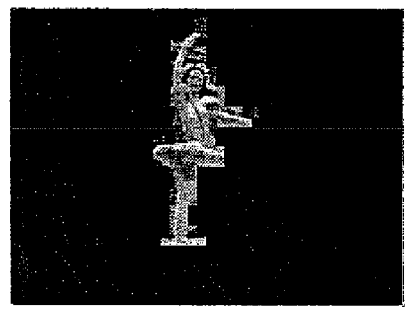

This is referred to as the global motion compensation ("GMC"). With reference to FIG. 5, a moving ballerina is shown against a largely stagnant background. In FIG. 5(a), the original motion vectors for an exemplary frame of compressed video is illustrated. In FIG. 5(b), the vector map for the exemplary frame is shown after GMC has been applied. As illustrated in FIG. 5(b), for motion vectors of the background, GMC gives mostly zero values, while for motion vectors of the foreground moving objects, GMC reveals the local motion of objects.

The moving objects themselves can be detected by comparing the magnitude of the local motion to a predetermined threshold value and by performing simple morphological operations to delete small false objects and to fill noisy spots. For example, in FIG. 5(c) there is shown an extracted moving object.

Figure 5D:

The DCT coefficients of the moving object are extracted from the compressed video information to provide for later querying of the object. Extraction of the DCT coefficient is done by the DCT domain motion compensation algorithm, as disclosed in U.S. Pat. No. 5,408,274 to Chang et al., the disclosure of which is incorporated by reference herein. The outermost points of the extracted object are used to form a bounding box, as illustrated in FIG. 5(d).

Again referring to FIG. 1, in the visualization module 120, the location and size of each extracted bounding box is saved in a database 126 for later browsing and indexing by a user. Likewise, visual features of extracted objects, such as color, textures, and shape, are used to provide content-based visual querying 127 of these and associated video scenes.

Figure 6:
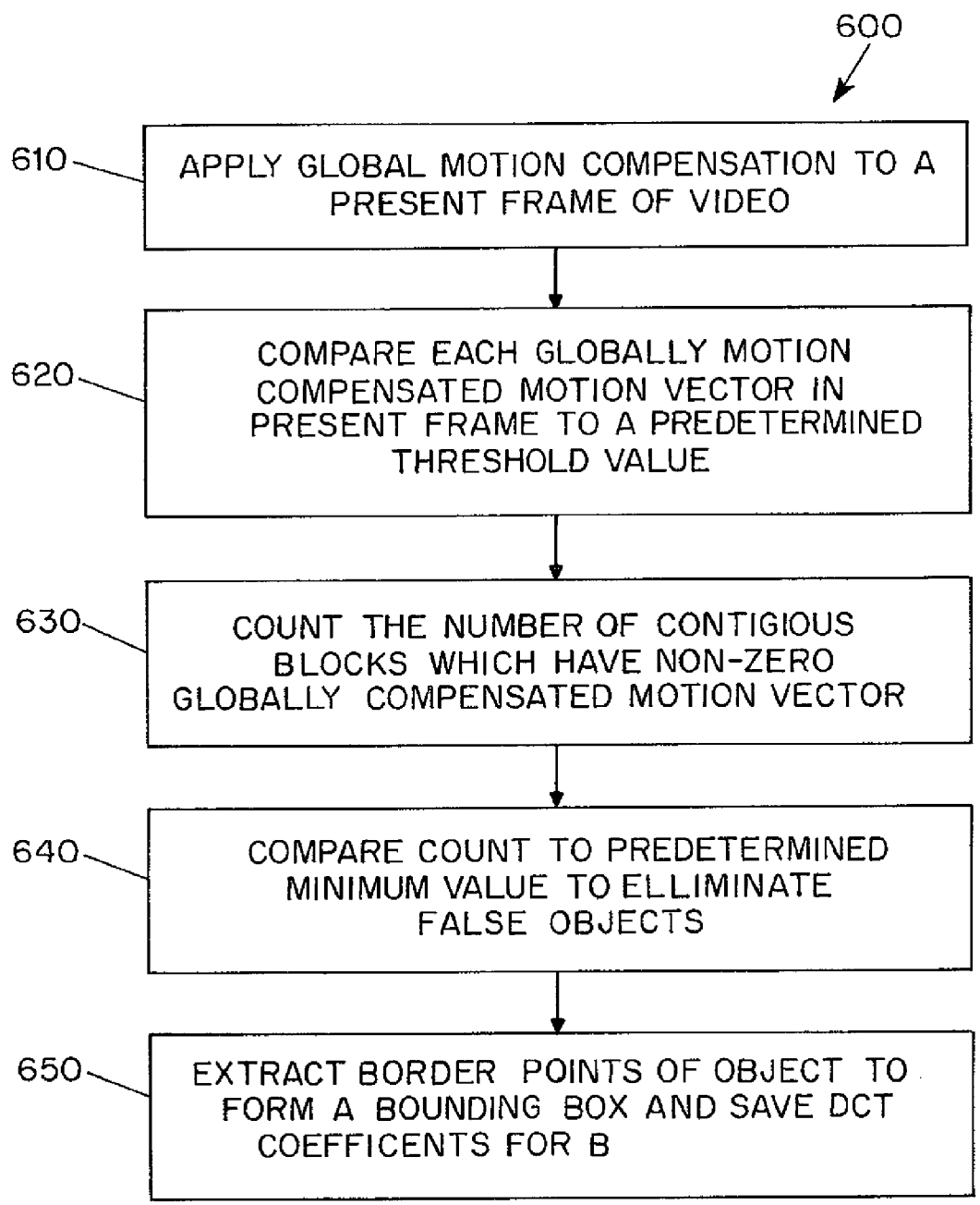
FIG. 6 is a flowchart which illustrates global motion compensation in accordance with one aspect of the present invention.

The extraction of moving video objects from a compressed bitstream will now be described with reference to the flow diagram 600 of FIG. 6. First, GMC is applied to the present frame of video 610. Second, each globally motion compensated motion vector is compared to a predetermined threshold value 620 in order to eliminate non-moving parts of the frame from further consideration. Next, for blocks of information which still have non-zero motion vectors, the number of contiguous blocks are counted 630. For each contiguous area, the number of associated blocks are compared to a predetermined minimum threshold value 640 in order to eliminate false small objects from being detected. Finally, the border points for the remaining objects are identified and saved in a database, e.g. database 126, for later use 650, together with corresponding DCT coefficients for all blocks within the border. In this way, the important moving video object can be extracted and indexed for later viewing by a user.

Figure 7:
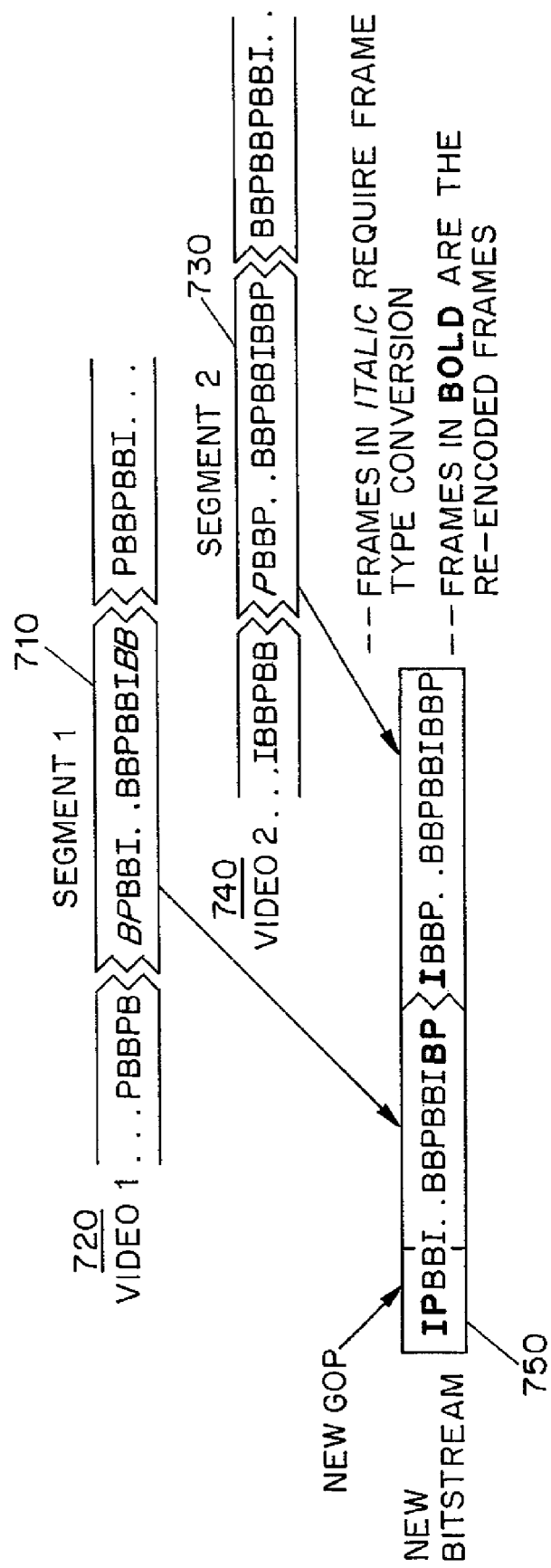
FIG. 7 depicts prior art editing of compressed video bistreams.

With reference to FIG. 7, useful techniques for directly editing compressed digital video will now be described. In general, editing of compressed video is directed to permitting a user to cut a first segment of video 710 from a first video sequence 720 and a second segment of video 730 from a second sequence of video 740 to form a new bitstream of video information 750. Such techniques have been described in the art, including in the article by the present inventors, J. Meng et al., "Tools for Compressed-Domain Vide Indexing and Editing," SPIE Conf. on Storage and Retrieval for Image and Video Database, Vol. 2670 (1996), the disclosure of which is incorporated by reference herein.

In addition to the basic editing function "cut and paste", several more advanced visual effects can be created in the compressed domain. For I frames, the basic compression component is the Discrete Cosine Transform (DCT), which can be written in the following form:

$$F(u,v)=DCT(f(x,y)) \qquad (5)$$

Given the DCT, linear operations such as intensity addition and scaling can performed in accordance with equations (6) and (7):

$$DCT(f_1(x,y)+f_2(x,y))=F_1(u,v)+F_2(u,v) \qquad (6)$$

$$DCT(\alpha \cdot f(x,y))=\alpha \cdot F(u,v) \qquad (7)$$

Algorithms for other operations such as spatial scaling, translation, and filtering in DCT domain are well known in the art. Generally, the DCT of the output video Y can be obtained by linear matrix operations of the input DCT, $P_i$, as follows:

$$Y = \sum_i W_i \cdot P_i \cdot H_i \qquad (8)$$

where $H_i$ and $W_i$ are special filter coefficient matrices in the DCT domain. For motion compensated B and P frames, the compressed-domain manipulation functions can be implemented in two ways. First, transform-domain techniques can be used to convert B and P frames to intraframe DCT coefficients, on which the above techniques can be readily applied. An alternative approach is to keep the B or P structure (i.e., the DCT coefficients of residual errors and motion vectors) and develop algorithms directly utilizing these data. Several advanced visual effects which can be created in the compressed domain—dissolve, masking, freeze frame, variable speed, and strobe motion—are now particularly described.

Figure 8A:
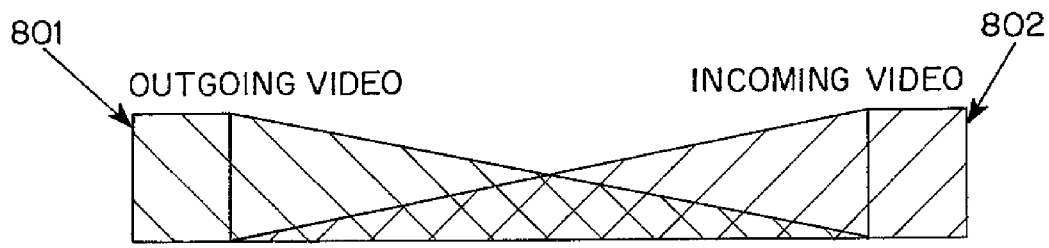
FIG. 8a depicts the dissolve effect.

One of the most important tools used in film editing is dissolve. As illustrated in FIG. 8(a), dissolve refers to the technique where an outgoing video scene 801 is faded out while an incoming video scene 802 is faded in. In order to perform a dissolve on two different scenes of video, the actual DCT coefficients for each block of compressed video in the last frame of the outgoing video scene, and the DCT coefficients for each block of compressed video in the first frame of the incoming video scend, must be extracted. One technique for extracting such DCT coefficients is described in the above-mentioned Chang et al. patent. The Chang et al. patent describes a technique which uses DCT domain inverse motion compensation to obtain the DCT coefficients for all blocks of video information which make up the needed frames of video.

When there is no or little motion in the two videos scenes, the dissolve effects can be approximated by the linear combination of the two video scenes $F_1$ and $F_2$:

$$F(u,v,t)=\alpha(t) \cdot F_1(u,v,t_1)+(1-\alpha(t)) \cdot F_2(u,v,t_2) \qquad (9)$$

v and v are coordinates within a frame, t is the frame index value which may range from 1 to N, a being the total number of frames in the dissolved region, and $\alpha(t)$ is a weighing function that is variable from 100% to 0%, $F_1$ is the composite of the derived DCT coefficients for all blocks which make up the last frame of the outgoing video scene and $F_2$ is the composite of the derived DCT coefficients for all blocks which make up the first frame of the incoming video scene. The resulting effect is a dissolve transition from a particular frozen frame of the outgoing video scene to another frozen frame of the incoming video scene.

Thus, to smooth out the dissolve where one or both of the dissolving scenes contain moving video objects, it is desirable to re-encode several dissolving frames over a transitional period $t_1$-$t_2$. The reader is referred to the Appendix of this patent document for our preferred source code for implementing a dissolve.

Figure 8B:
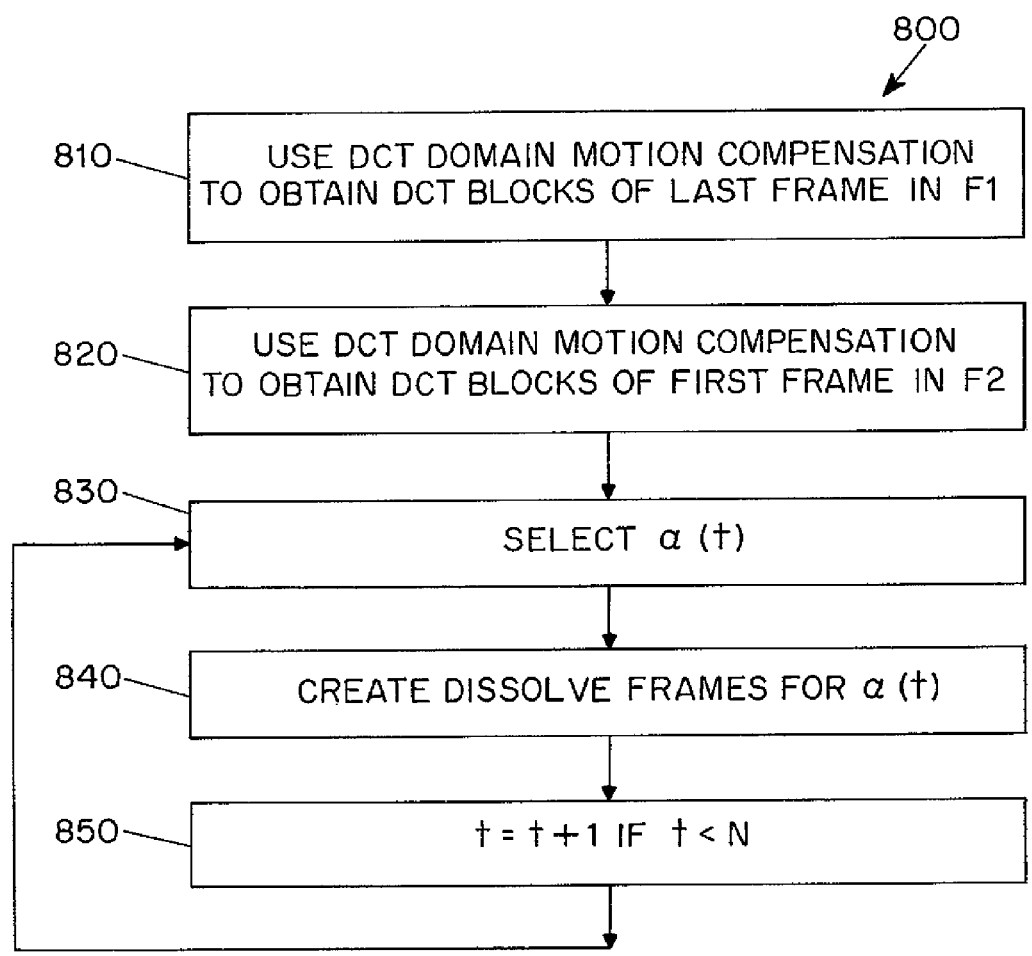
FIG. 8(b) is a flowchart which illustrates the dissolve effect.

Referring to FIG. 8(b), a method for dissolving an incoming scene and an outgoing scene of video is now described by way of a flowchart 800. In step 810, DCT domain motion compensation is used to obtain the DCT coefficients for all blocks of video information which make up the last frame of an outgoing video scene $F_1$. In step 820, DCT domain motion compensation is used to obtain the DCT coefficients for all blocks of video information which make up the first frame of an incoming video scene $F_2$. In step 830, the initial value for the weighing function, $\alpha(t)$, is chosen. In step 840, equation 9 is applied to create a first frame in the dissolve region. The value of t is then incremented until a final value n is obtained 850. The process 830-850 is repeated to create all dissolve frames for the duration t=1 to n.

Figure 9A:
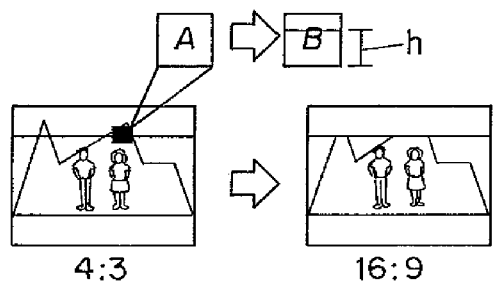
FIG. 9a depicts masking.

A second important tool used in film editing is masking. As illustrated in FIG. 9(a), the film effect of masking video refers to transforming an original video scene having e.g. a 4:3 aspect ratio to different aspect ratios such as 1:1.66, 1:1.85, 1:2.35, or 16:9. Masking can also be used to crop part of the frame region to a different frame size. For I frames, the DCT coefficients for blocks outside of the desired region are set to 0, and the coefficients for blocks that lie on the masking boundaries can recalculated using a simplified DCT cropping algorithm:

$$DCT(B) = DCT(H) \cdot DCT(A), \text{ where } H = \begin{bmatrix} 0 & 0 \\ 0 & I_h \end{bmatrix} \qquad (10)$$

where A is an original block located on the boundary, B is the new masked block, and $I_h$ is the identity matrix with size h×h, as shown in FIG. 9a.

For P and B frames, only macroblocks with motion vectors pointing outside of the masking region need to be re-encoded. Macroblocks with motion vectors pointing inside do not need any modification. Efficient algorithms for reencoding macroblocks are well known in the art and are described in, for example, the above-referenced Chang et al. patent.

Figure 9B:
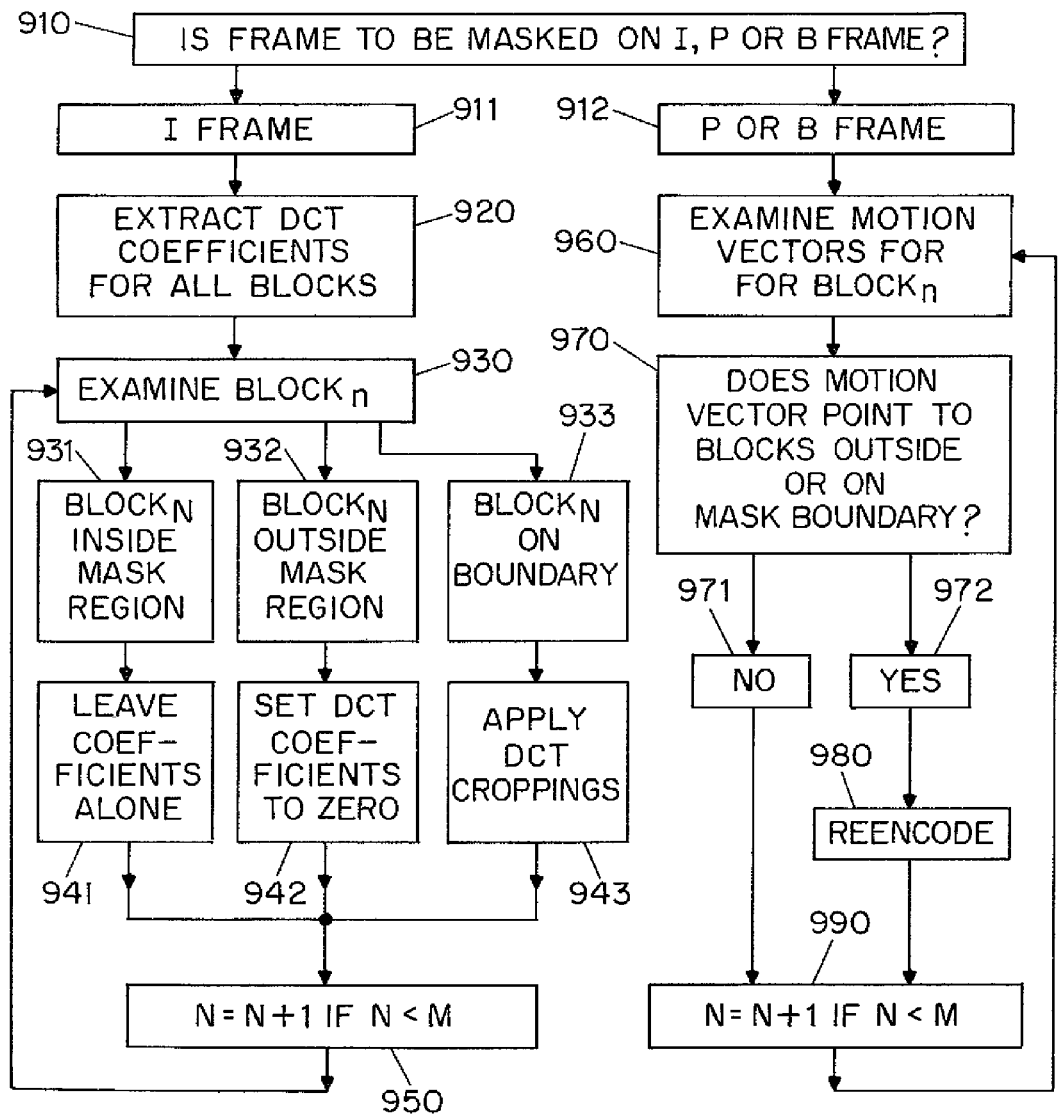
FIG. 9(b) is a flowchart which illustrates masking.

Referring to FIG. 9(b), a method for performing masking is now described. In step 910, the frame to be masked is examined in order to determine whether it is an I, P or B frame. If the frame is an I frame 911, all DCT coefficients for all blocks within the frame are extracted 920. Block, is examined 930 to determine where in the frame it is located. If the block is inside the mask region 931, the DCT coefficients for the block are unchanged 941. If the block is outside the make region 932, the DCT coefficients for the block are set to zero 942. If the block is on the boundary of the masked region 933, the DCT cropping algorithm, i.e., equation 10, is applied 943. The block index n is incremented 950 and the process repeated 930-950 until all blocks have been examined.

If, however, the frame to be masked is either a P or B frame 920, motion vectors associated with block, are examined 960 to determine whether they point to blocks outside or on the mask region 970. If a motion vector points to blocks outside or on the mask region 972, the macroblock is reencoded 980. The block index n is incremented 990 and the process repeated 960-990 until all blocks have been examined.

A third important tool used in film editing is the freeze effect. Since the freeze effect is usually longer than 1 second, simply repeating duplicate frames is not desirable if interactive playback (e.g. random search) is desired. Instead, the film effect of freeze frame requires the use of periodic I frames.

Thus, in order to ensure interactive playback capabilities, if the frozen frame is a P or B frame, it should be converted to an I frame. In order to convert a P or B frame into an I frame, every block of video information for the frame that has an associated motion vector is converted into a pure array of DCT coefficients, without motion vector information. The above-mentioned DCT domain motion compensation algorithm described in the Chang et al. patent is advantageously used to effect such conversion. The converted blocks can be referred to as intracoded blocks. Thereafter, the group of pictures which represent the frozen frame are filled with duplicated P frames, with all macroblocks in the duplicated P frames being to Motion Compensation Not Coded (i.e., 0 motion vector, and 0 residue error). Duplicate P frames can easily be created independently and inserted after I or P frames, as those familiar with digital compression techniques will easily understand.

Figure 10:
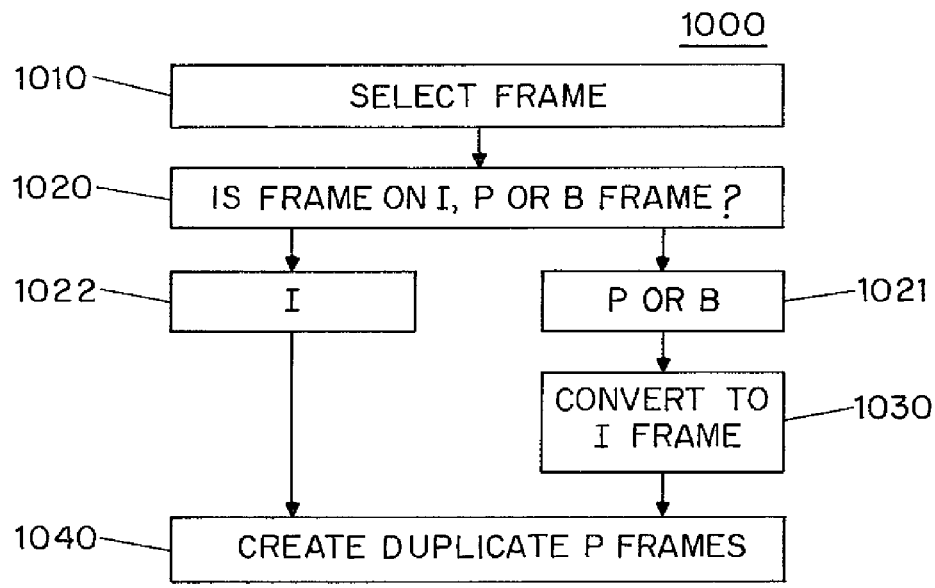
FIG. 10 is a flowchart which illustrates the freezeframe effect.

A method for generating a frozen frame of video information is now described with reference to flowchart 1000 in FIG. 10. In step 1010, a user-defined frame of compressed video information is selected for the freeze-frame effect. In step 1020, the frame is examined in order to determine whether it is an I, P or B frame. If the frame is not an I frame 1021, it is converted into an I frame 1030. Finally, original 1022 or converted 1030 I frames are then used as to create duplicate P frames 1040. Periodical I frames can be inserted to increase interactivity, and to maintain a compatible bitrate.

A fourth important tool used in film editing is variable speed playback. Faster than normal playback, e.g., fast forward, is simply realized by dropping B, P, and then I frames according to the variable speed desired.

Figure 11:
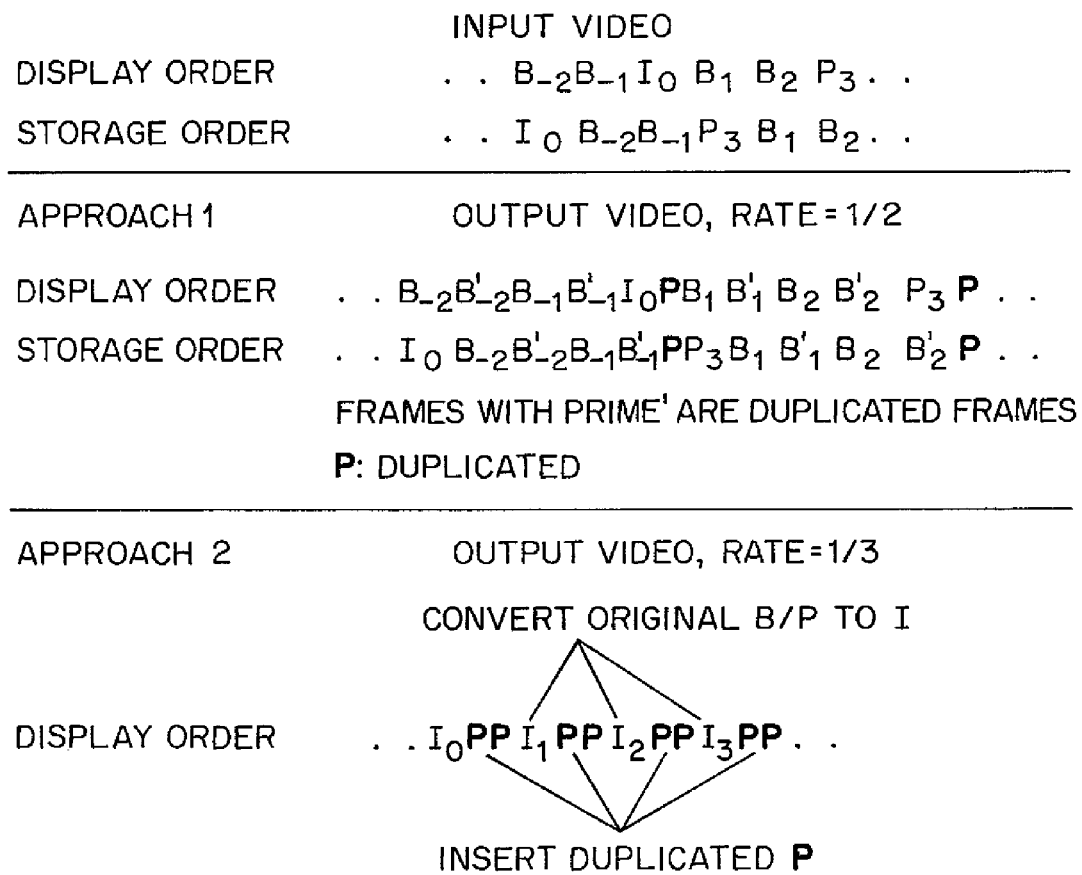
FIG. 11 depicts two alternative techniques for the slow motion effect.

With respect to slow motion, depending on the slow motion rate, there are two possible approaches. With reference to FIG. 11, one approach is to simply insert duplicate B frames (B') whenever an original B frame appears. Duplicate B frames are frames which copy all DCT coefficient, and associated motion vectors from previous B frame. There is no decoding or re-encoding involved in this approach. However, this approach has a drawback since the I/P frame delay is increased by a factor equal to the inverse of the motion rate. For example, in the illustrative sequence of frames shown in FIG. 11, the reference frame $I_0$ must be transmitted 4 frames earlier. This limitation makes this approach suitable for slow playback up to about ½ normal frame rate. This will require an increased decoder buffer size.

In approach 2, original P/B frames are converted to I frames using the DCT domain techniques described above, and duplicated P frames are inserted between I frames, as in the case with freeze frame. This approach reduces frame delay, although requiring extra DCT domain manipulations.

Another interesting tool used in film editing is the special effect of strobe motion, which is simply a combination of freeze frame and variable speed playback. Strobe motion is effected by dropping original B and/or P frames and inserting duplicated P frames.

Figure 12:
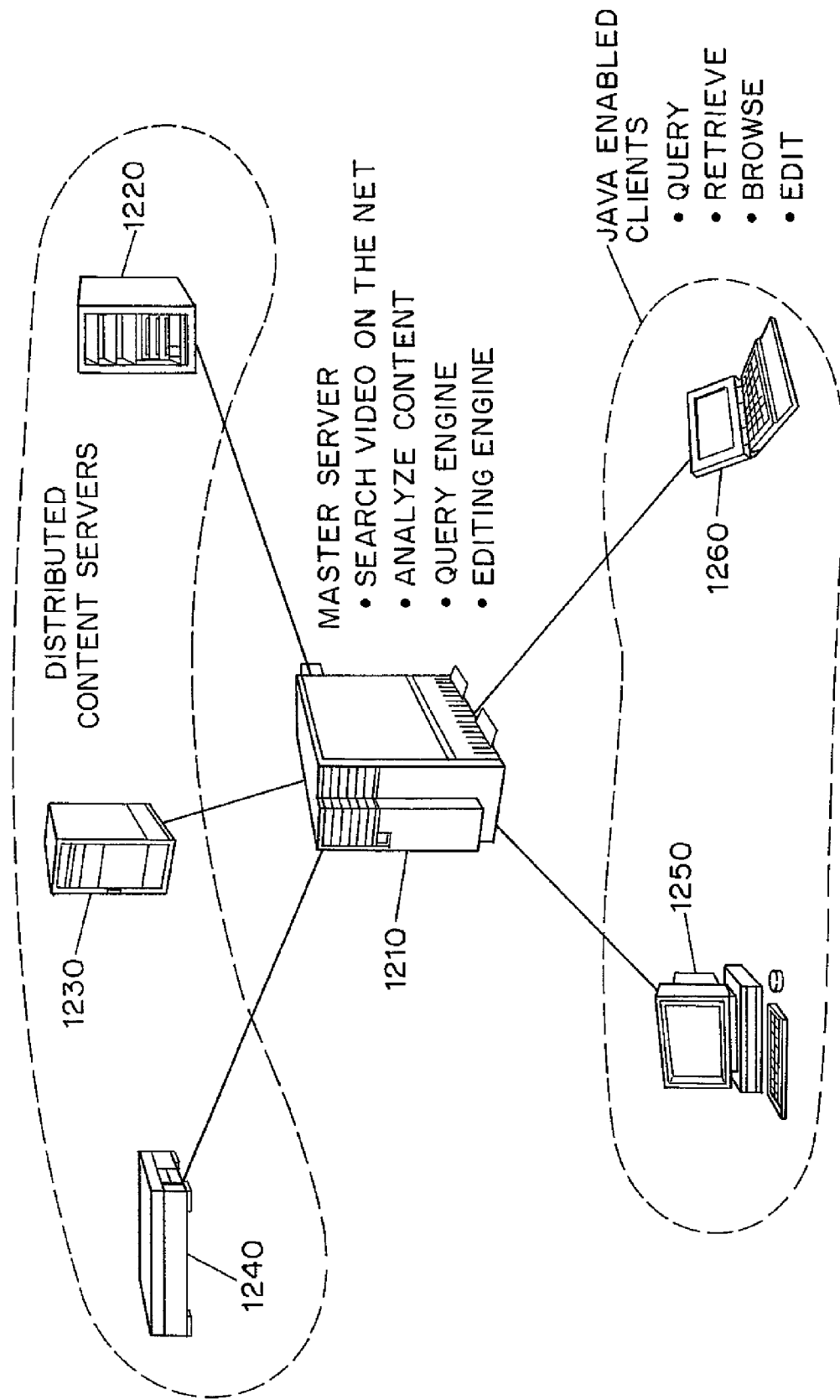
FIG. 12 is a system diagram of a distributed network in accordance with one aspect of the present invention.

Referring to FIG. 12, a system for enabling distributed clients to browse and manipulate digital video by way of a distant server or host computer is now described. A master server 1210 or a group of distributed servers is linked to distant sewers 1220, 1230, 1240 and several clients 1250, 1260. From their client workstations, users are empowered to browse and edit compressed vide images in the manner described above.

Figure 13:
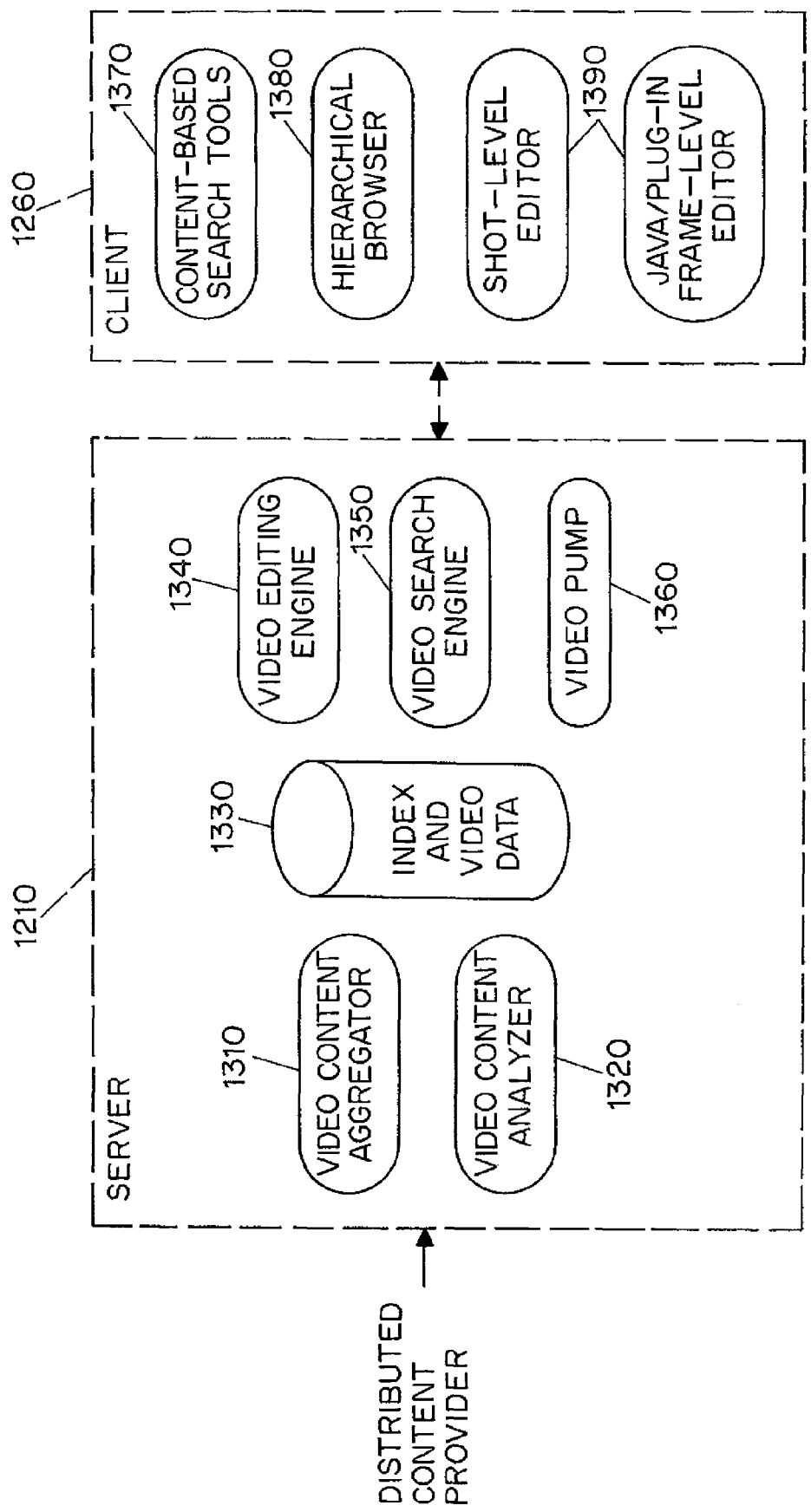
FIG. 13 depicts exemplarily techniques which may be executed in the distributed network illustrated in FIG. 12.

Moving to FIG. 13, the master server 1210 acts as the content aggregator 1310 to collect video content, and as a content analyzer 1320 to analyze the visual content for efficient indexing 1330. Thus, the server 1210 may accept the functions performed by the parsing module 110 described above. The server 1210 also provides an editing engine 1340 with basic editing tools, such as the tools described above, for rendering basic editing functions and various special effects. Distributed clients 1250, 1260 access the video archives of the server through heterogeneous networks with interoperable interfaces, such as JAVA or MPEG MSDL manipulation tools.

The video server 1210 can be linked with other distributed servers 1220, 1230, 1240 that have video search engines which search for image and video over a network, e.g., the World Wide Web. Once a video file is found on any other hosts or online content providers, it will be downloaded and preprocessed by the video server 1210 to extract "keyframes," i.e., frames 121 stored in the above described visualization module 120, and associated visual features such as camera motion, moving objects, color, texture, and temporal features. The Universal Resource Location ("URL") of the video and the extracted features will be stored on the video server 1210. This client-server model empowers clients 1250, 1260 with much richer resources beyond that provided by the client's local system.

The client 1260 may open any video shot stored at the server 1210 and browse 1330 the keyframes hierarchically using any one of numerous different viewing models, including sequential view, feature-based view, and story-based view. A sequential view arranges the video shots according to the sequential time order; a feature-based view clusters video shots with similar visual features to the same group; a story view presents video shots according to the story structures in the semantic level. For example, for news applications, the story model may use the anchorperson shot as the criterion for automatic segmentation of video into semantic-level stories. The client can also perform shot-level editing or frame level editing 1390 using the above discussed editing tools. The clients may also submit their own videos which may be analyzed and indexed by the server 1210.

To view or to further refine retrieved video shots, the client 1260 may choose different levels of resolution for the video shots sent by the server 1210. There are three broad levels of video rendering. At the first level, the client 1260 can render only straight cuts at low resolution without any special effects. At the second level, the client may send information to the server defining low-resolution video with desired special effects to be generated. Finally, when the client 1260 no longer wishes to perform editing, the master server 1210 will generate a full-resolution video with all the effects requested by the client from the highest quality source video which is located at either the matter server 1210 or the distributed remote content servers 1220, 1230, 1240. In this way, the user is given the flexibility to tradeoff between quality and speed.

In order to obtain a reduced resolution video sequence, for each video sequence stored on a server, a low resolution icon stream video must be extracted from the full resolution video. The icon stream is an 8:1 down sampled version of the original video. For I frames, DCT DC coefficients are obtained directly. For B and P frames, DCT domain inverse motion compensation is applied to the DCT coefficients. Finally, the extracted coefficients are converted into a smaller sized, e.g., 8:2:1, I frame as those skilled in the art will appreciate.

The foregoing merely illustrates the principles of the invention. Various modifications and alterations to the described embodiments will be apparent to those skilled in the art in view of the inventors teachings herein. For example, while the above description was directed to indexing and editing digital vide which has been compressed in accordance with the MPEG format, the foregoing is equally applicable to other compressed bitstreams, e.g., Motion JPEG, H.261 or H.263, or any other algorithm based on transform coding and motion compensation. It will thus be appreciated that those skilled in the art will be able to devise numerous systems and methods which, although not explicitly shown or described herein, embody the principles of the invention and are thus within the spirit and scope of the invention.

APPENDIX

```
int do_dissolve(int duration)
    {
      int i, j, k, s, cc;
      int blks;
      double alpha;
      short (*tmp[3])[64];
      ld = &S1;
      initbits( );
      ld->end = roundtoP(ld->end);
      do_cut(ld->begin, ld->end);
      getDCTframe(ld->end, GETDCT);
      /* copy the first DCT to tmpDCT */
      for (cc=0; cc<3; cc++) {
        if (cc==0)
            blks = (coded_picture_width*coded_picture_height)>>6;
        else
            blks = (chrom_width*chrom_height)>>6;
        memcpy(tmpDCT[cc], refDCT[cc], blks * sizeof(short [64]));
      }
      ld = &S2;
    initbits( );
    ld->begin = roundtoP(ld->begin);
    getDCTframe(ld->begin, GETDCT);
    /* first prediction is based on tmpDCT */
    for (cc=0; cc<3; cc++) {
      if (cc==0)
          blks = (coded_picture_width*coded_picture_height)>>6;
      else
          blks = (chrom_width*chrom_height)>>6;
      memcpy(auxDCT[cc], tmpDCT[cc], blks * sizeof(short [64]));
    }
    for(s=1;s<=duration;s++) {
      alpha=s/(double)duration;
      for (i=0; i<3; i++) {
        tmp[i] = oldrefDCT[i];
        oldrefDCT[i] = auxDCT[i];
        auxDCT[i] = tmp[i];
        newDCT[i]= auxDCT[i];
      }
      for (cc=0; cc<3; cc++) {
        if (c==0)
            blks =
```

APPENDIX-continued

```
            (coded_picture_width*coded_picture_height)>>6;
        else
            blks = (chrom_width*chrom_height)>>6;
        for (j=0; j<blks; j++) {
          for (k=0; k<64; k++)
            newDCT[cc][j][k] = (short)
            CLAMP(-2048,(1-alpha)*tmpDCT[cc][j][k]
                +alpha*refDCT[cc][j][k],2047);
        }
      }
    }
    /* use refoldDCT as reference frame for DPCM of P */
    putpictDCT(0);
    }
}
```

The invention claimed is:

1. A method for dissolving an incoming scene of video information which comprises a sequence of fields or frame of compressed video information and an outgoing scene of video information which comprises a sequence of fields or frame of compressed video information using a computer-based tool, comprising:
   a. extracting transform coefficients for all blocks of video information which make up a last frame of said outgoing video scene;
   b. extracting transform coefficients for all blocks of video information which make up the first frame of said incoming video scene; and
   c. creating a first frame in a dissolve region, said first frame comprising a combination of said transform coefficients of said last outgoing frame and said transform coefficients of said first incoming frame, said dissolve region being made playable as a transition between said outgoing and incoming scenes during playback of a video containing said outgoing and incoming scenes of video information.

2. The method of claim 1, further comprising the step of choosing an initial value for a weighing function prior to step (c).

3. The method of claim 2, further comprising the steps of d. incrementing said weighing function value; and e. creating a second frame in said dissolve region from said first incoming frame using said incremented weighing function value.

4. The method of claim 1, wherein the transform coefficients were generated using the domain cosine transform.

5. A system for editing compressed video information over a distributed network, comprising:
   a. a client computer;
   b. a network link, coupled to said client computer, for permitting said client computer to search for and locate compressed video information on said distributed network; and
   c. means for editing a compressed bitstream of video information over said distributed network, including means for dissolving an incoming scene of video information which includes a sequence of fields or frame of compressed video information and an outgoing scene of video information which includes a sequence of fields or frame of compressed video information, said dissolving means comprising:
      a. outgoing transform coefficient extraction means to obtain transform coefficients for all blocks of video information which make up a last frame of said outgoing video scene;
      b. incoming transform coefficient extraction means to obtain the transform coefficients for all blocks of video information which make up a first frame of said incoming video scene; and c. dissolve region creating means, coupled to said incoming extraction means and to said outgoing extraction means, for creating a first frame in a dissolve region, said first frame comprising a combination of said transform coefficients of said last outgoing frame and said transform coefficients of said first incoming frame.

* * * * *